United States Patent
Rakowski et al.

(10) Patent No.: US 11,555,964 B1
(45) Date of Patent: Jan. 17, 2023

(54) OPTICAL DEVICE WITH LOW-LOSS THERMALLY TUNABLE CLOSED-CURVE OPTICAL WAVEGUIDE

(71) Applicant: GLOBALFOUNDRIES U.S. Inc., Malta, NY (US)

(72) Inventors: Michal Rakowski, Ballston Lake, NY (US); Petar I. Todorov, Sofia (BG); Yusheng Bian, Ballston Lake, NY (US); Won Suk Lee, Malta, NY (US); Asif J. Chowdhury, Clifton Park, NY (US); Kenneth J. Giewont, Hopewell Junction, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/363,846

(22) Filed: Jun. 30, 2021

(51) Int. Cl.
| | |
|---|---|
| G02B 6/125 | (2006.01) |
| G02F 1/01 | (2006.01) |
(Continued)

(52) U.S. Cl.
CPC ........... *G02B 6/125* (2013.01); *G02F 1/0147* (2013.01); *G02B 6/136* (2013.01); *G02B 2006/12061* (2013.01); *G02B 2006/12147* (2013.01)

(58) Field of Classification Search
CPC ................... G02B 6/125; G02B 6/136; G02B 2006/12061; G02B 2006/12147; G02F 1/0147
See application file for complete search history.

(56) References Cited

U.S. PATENT DOCUMENTS

| 7,616,850 | B1 | 11/2009 | Watts et al. | |
|---|---|---|---|---|
| 8,078,013 | B2 * | 12/2011 | Li | G02F 1/025 385/129 |

(Continued)

OTHER PUBLICATIONS

De Heyn et al., "Fabrication-Tolerant Four-Channel Wavelength-Division-Multiplexing Filter Based on Collectively Tuned Si Microrings", Journal of Lightwave Technology, vol. 31, No. 16, 2013, pp. 2785-2792.

(Continued)

*Primary Examiner* — John Bedtelyon
(74) *Attorney, Agent, or Firm* — Anthony Canale; Hoffman Warnick LLC

(57) ABSTRACT

Disclosed is a photonic structure and associated method. The structure includes a closed-curve waveguide having a first height, as measured from the top surface of an insulator layer, and an outer curved sidewall that extends essentially vertically the full first height (e.g., to minimize signal loss). The structure includes a closed-curve thermal coupler and a heating element. The closed-curve thermal coupler is thermally coupled to and laterally surrounded by the closed-curve waveguide and has a second height that is less than the first height. In some embodiments, the closed-curve waveguide and the closed-curve thermal coupler are continuous portions of the same semiconductor layer having different thicknesses. The heating element is thermally coupled to the closed-curve thermal coupler and thereby indirectly thermally coupled to the closed-curve waveguide. Thus, the heating element is usable for thermally tuning the closed-curve waveguide via the closed-curve thermal coupler to minimize any temperature-dependent resonance shift (TDRS).

20 Claims, 13 Drawing Sheets

(51) Int. Cl.
*G02B 6/136* (2006.01)
*G02B 6/12* (2006.01)

(56) References Cited

U.S. PATENT DOCUMENTS

| | | |
|---|---|---|
| 3,098,968 A1 | 1/2012 | Green et al. |
| 3,150,223 A1 | 4/2012 | Li et al. |
| 2020/0353143 A1 | 11/2020 | Mk et al. |

OTHER PUBLICATIONS

De Villers et al., "Ultra-Compact DWDM Filter Tunable Across the C-Band", OSA 2019, pp. 1-3.

Dong et al., "Thermally Tunable Silicon Racetrack Resonators with Ultralow Tuning Power", OSA, vol. 18, No. 19, 2010, pp. 20298-20304.

Mianganelli et al., "Large-FSR Thermally Tunable Double-Ring Filters for WDM Applications in Silicon Photonics", IEEE Photonics Journal, vol. 9, No. 1, 2017, pp. 1-11.

Papaioannou et al., "On-Chip Dual-Stream DWDM Eight-Channel-Capable SOI-Based MUXs/DEMUXs With 40-GHz Channel Bandwidth", IEEE Photonics Journal, vol. 7, No. 1, 2015, pp. 1-11.

Frey et al., "Temperature-Dependent Refractive Index of Silicon and Germanium", Proceedings of SPIE, vol. 6273, Optomechanical Technologies for Astronomy 2006, pp. 1-10.

Littlejohns et al., "Cornerstone's Silicon Photonics Rapid Prototyping Platforms: Current Status and Future Outlook", Applied Sciences, vol. 10, 8201, 2020, pp. 1-34.

\* cited by examiner

OPTICAL DEVICE WITH LOW-LOSS THERMALLY TUNABLE CLOSED-CURVE OPTICAL WAVEGUIDE

BACKGROUND

Field of the Invention

The present invention relates to temperature-sensitive closed-curve optical waveguides and, more particularly, to embodiments of a photonic structure including an optical device with a low-loss, thermally tunable, closed-curve optical waveguide.

Description of Related Art

An optical ring resonator includes multiple optical waveguides. In the simplest of optical ring resonators, the optical waveguides include a bus waveguide (i.e., an optical waveguide with discrete ends including an input end and an output end) and a closed-curve waveguide (i.e., an optical waveguide with a complete loop or ring shape having no discrete ends), which is spatially separated from but optically coupled to the bus waveguide. Light signals can enter the bus waveguide at the input end. Due to optical coupling, some light signals will pass into the closed-curve waveguide from the bus waveguide and some light signals will pass from the closed-curve waveguide into the bus waveguide. Light signals will also exit the bus waveguide at the output end. However, within the closed-curve waveguide, light signals of a specific resonant wavelength for that closed-curve waveguide will make repeated roundtrips through the closed-curve waveguide, building up intensity, due, for example, to constructive interference. As a result, the light signals that pass from the closed-curve waveguide into the bus waveguide will, predominantly, have the specific resonant wavelength. Thus, such a ring resonator can be effectively employed as a filter. However, depending upon the properties of the core material used, closed-curve waveguides can be thermally sensitive. That is, they can exhibit temperature-dependent resonance shifts (TDRS). For example, closed-curve silicon waveguides are known to be thermally sensitive and the potential TDRS can be, for example, approximately 70 picometers per Kelvin (pm/K) or more. To minimize TDRS, many photonic structures that include closed-curve waveguide(s) also include corresponding heater(s) to thermally tune (i.e., heat) the closed-curve optical waveguide(s). Unfortunately, currently available configurations for such photonic structures tend to exhibit performance degradation (e.g., optical power loss).

SUMMARY

Disclosed herein are embodiments of a photonic structure. The photonic structure can include an optical device. The optical device can include one or more optical waveguides including at least one closed-curve waveguide. For example, in some embodiments, the optical device can be a ring resonator, which includes at least one bus waveguide and at least one closed-curve waveguide positioned laterally adjacent to the bus waveguide and, more particularly, spatially separated from but optically coupled to the bus waveguide. The closed-curve waveguide can have a first height and, particularly, having an outer curved sidewall that extends vertically the first full height. The photonic structure can further include a closed-curve thermal coupler. This closed-curve thermal coupler can be laterally surrounded by and thermally coupled to the closed-curve waveguide. The closed-curve thermal coupler can further have a second height that is less than the first height of the closed-curve waveguide. In some embodiments, the closed-curve waveguide and the closed-curve thermal coupler are continuous portions of the same semiconductor layer (e.g., the same silicon layer) having different thicknesses. The photonic structure can further include a heating element. The heating element can be adjacent to the closed-curve thermal coupler and, more particularly, thermally coupled to the closed-cure thermal coupler and thereby indirectly thermally coupled to the closed-curve waveguide. As a result, heat energy generated and output by the heating element can pass into the closed-curve thermal coupler, can pass through the closed-curve thermal coupler, and can further pass into the closed-curve waveguide. Thus, the heating element can be used to thermally tune the closed-curve waveguide via the closed-curve thermal coupler in order to minimize any temperature-dependent resonance shift (TDRS).

Also disclosed herein are embodiments of a method of forming the above-described photonic structure. The method can include forming an optical device. The process of forming the optical device can include forming one or more optical waveguides including at least one closed-curve waveguide. For example, in some embodiments, the process of forming the optical device can include forming a ring resonator, which includes at least one bus waveguide and at least one closed-curve waveguide positioned laterally adjacent to the bus waveguide and, more particularly, spatially separated from but optically coupled to the bus waveguide. The closed-curve waveguide of the optical device can be formed so as to have a first height and, particularly, so as to have an outer curved sidewall that extends essentially vertically the full first height. The method can further include forming a closed-curve thermal coupler. This closed-curve thermal coupler can be formed so as to be laterally surrounded by and thermally coupled to the closed-curve waveguide and further so as to have a second height that is less than the first height of the closed-curve waveguide. In some embodiments, the closed-curve waveguide and the closed-curve thermal coupler are formed as continuous portions of the same semiconductor layer (e.g., the same silicon layer) having different thicknesses. The method can further include forming a heating element. The heating element can be formed adjacent to the closed-curve thermal coupler such that it is thermally coupled to the closed-curve thermal coupler and thereby indirectly thermally coupled to the closed-curve waveguide. The method can further include using the heating element to thermally tune the closed-curve waveguide via the closed-curve thermal coupler (e.g., using the heating element to generate and output heat energy, which passes into and through the closed-curve thermal coupler and which further passes into the closed-curve waveguide) in order to minimize any temperature-dependent resonance shift (TDRS).

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

Figure 1:
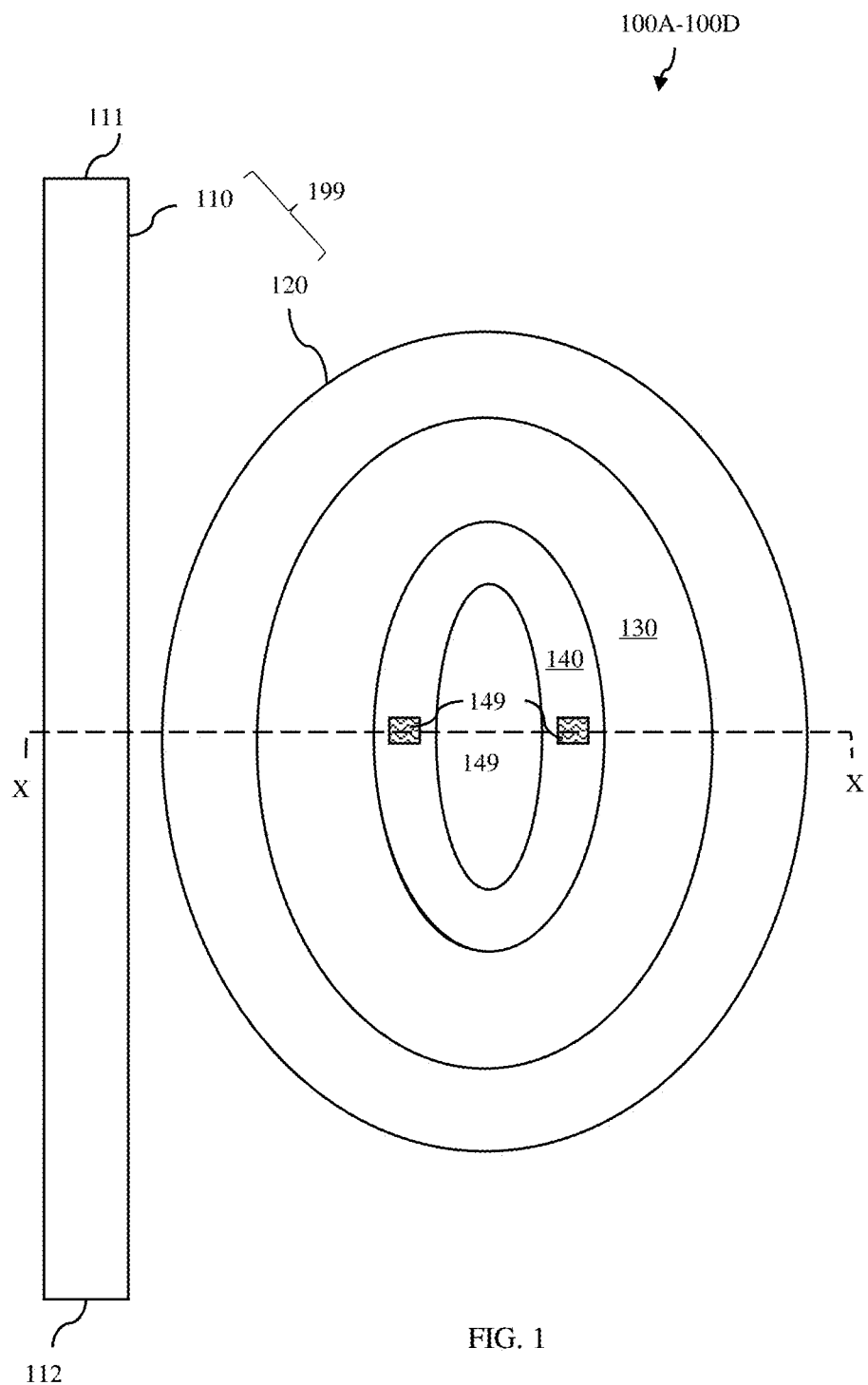
FIG. 1 is a layout diagram of a photonic structure.

As mentioned above, closed-curve waveguides (i.e., optical waveguides with a complete loop or ring shape having no discrete ends) can be thermally sensitive depending upon the properties of the core materials used. That is, they can exhibit temperature-dependent resonance shifts (TDRS). For example, closed-curve silicon waveguides are known to be thermally sensitive and the potential TDRS can be, for example, approximately 70 picometers per Kelvin (pm/K) or more. To minimize TDRS, many photonic structures that include closed-curve optical waveguide(s) also include corresponding heater(s) to thermally tune (i.e., heat) the closed-curve optical waveguide(s). Unfortunately, currently available configurations for such photonic structures tend to exhibit performance degradation (e.g., optical power loss).

In view of the foregoing, disclosed herein are embodiments of a photonic structure that includes an optical device with a low-loss, thermally tunable, closed-curve optical waveguide. More particularly, disclosed herein are embodiments of a photonic structure. This photonic structure can include an optical device with one or more optical waveguides including at least one closed-curve waveguide. The closed-curve waveguide can have a first height, as measured from the top surface of an insulator layer, and an outer curved sidewall that extends essentially vertically the full first height (e.g., so as to minimize signal loss and improve mode confinement, as discussed further below). The photonic structure can also include a closed-curve thermal coupler, which is thermally coupled to and laterally surrounded by the closed-curve waveguide and which has a second height that is less than the first height. In some embodiments, the closed-curve waveguide and the closed-curve thermal coupler can be continuous portions of the same semiconductor layer (e.g., the same silicon layer or, alternatively, the same polysilicon, germanium, or silicon germanium layer) having different thicknesses. Finally, the photonic structure can include a heating element, which is thermally coupled to the closed-curve thermal coupler (e.g., in the same design level or in a different design level) and thereby indirectly thermally coupled to the closed-curve waveguide via the closed-curve thermal coupler. In such a photonic structure, the heating element can be used to thermally tune the closed-curve waveguide via the closed-curve thermal coupler in order to minimize any temperature-dependent resonance shift (TDRS). Also disclosed herein are method embodiments for forming the above-described photonic structure.

More particularly, disclosed herein are various embodiments of a photonic structure. For example, see the photonic structure embodiments 100A-100D shown in the layout diagram of FIG. 1 and further illustrated in the alternative cross-section diagrams of FIGS. 1A-1D, respectively; see the photonic structure embodiments 200A-200D shown in the layout diagram of FIG. 2 and further illustrated the alternative cross-section diagrams of FIGS. 2A-2D, respectively; and see the photonic structure embodiments 300A-300B shown in the layout diagram of FIG. 3 and further illustrated in the alternative cross-section diagrams of FIGS. 3A-3B.

Each of the photonic structure embodiments 100A-100D, 200A-200D, 300A-300B can include a substrate 101, 201, 301. The substrate 101, 201, 301 can be, for example, a semiconductor substrate, such as a silicon substrate. Each of the photonic structure embodiments 100A-100D, 200A-200D, 300A-300B can further include an insulator layer 102, 202, 302 on the substrate 101, 201, 301 and an optical device 199, 299, 399, which includes one or more optical waveguides and, more particularly, which includes at least one closed-curve waveguide 120, 220, 320, on the insulator layer 102, 202, 302.

Each optical waveguide of the optical device 199, 299, 399 can be, for example, a semiconductor waveguide, such as a silicon waveguide or, alternatively, a polysilicon waveguide, a germanium waveguide, a silicon germanium waveguide, or any other type of waveguide having a core material with a temperature-dependent refractive index.

Those skilled in the art will recognize that, to facilitate optical signal propagation through an optical waveguide, the waveguide material (also referred to as the core material) should have a first refractive index and should be surrounded by cladding material that has a second refractive index that is less than the first refractive index. For example, silicon has a refractive index that is a function of both temperature and wavelength. That is, given a wavelength of 1 micron, the refractive index of silicon can range from approximately 3.52 to approximately 3.57 at temperatures ranging from approximately 50K to approximately 295K, respectively. However, given a wavelength of 5 micron, the refractive index of silicon is lower and can range from approximately 3.39 to approximately 3.43 at temperatures ranging from approximately 50K to approximately 295K, respectively. Thus, if the optical waveguide(s) of the optical device 199, 299, 399 are silicon, then the insulator layer 102, 202, 302, which is immediately adjacent to the bottom surfaces of the optical waveguide(s) and which will function as cladding material, could be, for example, a silicon dioxide layer with a refractive index of less than 1.6, a silicon nitride layer with a refractive index of less than 2.1, or a layer of any other suitable insulator material with a refractive index that is less than the lowest refractive index of silicon.

As mentioned above, the optical device 199, 299, 399 can include one or more optical waveguides with at least one optical waveguide being a closed-curve waveguide. A "closed-curve" waveguide refers to a waveguide with a complete loop or ring shape having no discrete ends such that optical signals can make repeated roundtrips through the waveguide. For purposes of illustration, the closed-curve waveguide 120, 220, 320 is shown in the figures as having an elliptical ring shape with no discrete ends. However, it should be understood that the figures are not intended to be limiting and that, alternatively, the closed-curve waveguide 120, 220, 320 could have any other complete loop or ring shape (e.g., a circular ring shape, an oval ring shape, a racetrack ring shape, etc.) with no discrete ends. In any case, the closed-curve waveguide 120, 220, 320 can have a bottom surface immediately adjacent to the top surface of the insulator layer 102, 202, 302 and a top surface that is opposite and essentially parallel to the bottom surface. Thus, the closed-curve waveguide 120, 220, 320 can have a first height 125, 225, 325, as measured from the top surface of the insulator layer 102, 202, 302.

The closed-curve waveguide 120, 220, 320 can have an outer curved sidewall 121, 221, 321, which defines the outer boundary of the waveguide and which extends essentially vertically the full first height (i.e., from the top surface of the insulator layer 102, 202, 302 to the top surface of the waveguide). The closed-curve waveguide 120, 220, 320 can also include an inner curved sidewall 122, 222, 322, which is opposite the outer curved sidewall 121, 221, 321 and which defines the inner boundary of the waveguide. The dimensions of the closed-curve waveguide 120, 220, 320 can be customized to achieve desired results. For example, the height and width of the closed-curved waveguide can be customized to facilitate propagation of light signals having wavelengths within a given wavelength range. Furthermore, the circumference of the closed-curve waveguide can be customized to achieve a specific resonant wavelength and to set how often resonance occurs. As mentioned above, the resonant wavelength of a closed-curve waveguide refers to the wavelength of light signals that will make repeated roundtrips through the closed-curve waveguide, building up intensity. Techniques for customizing the dimensions of waveguides are well known in the art and, thus, the details have been omitted from this specification in order to allow the reader to focus on the salient aspects of the disclosed embodiments. It should be noted that having an outer curved sidewall that is essentially vertical from the top surface of the insulator layer 102, 202, 302 to the top surface of the closed-curve waveguide minimizes loss of signals with the specific resonant wavelength through the outer curved sidewall 121, 221, 321. Low loss is extremely important for device performance when circumference is small resulting in tight bends.

In some embodiments, the optical device 199, 299, 399 can be a ring resonator. As discussed above, a ring resonator can include a bus waveguide 110, 210, 310 positioned laterally adjacent and optically coupled to a closed-curve waveguide 120, 220, 320, as described above. A "bus" waveguide refers to a waveguide with discrete ends including an input end 111, 211, 311 and an output end 112, 212, 312. For purposes of illustration, the bus waveguide 110, 210, 310 is shown in the figures as including an essentially linear path between the input end and the output end. However, it should be understood that the figures are not intended to be limiting and that, alternatively, the bus waveguide 110, 210, 310 could include a non-linear path between the input end and the output end. That is, alternatively, the bus waveguide 110, 210, 310 could include one or more curves. In any case, the bus waveguide 110, 210, 310, like the closed-curve waveguide 120, 220, 320, can have a bottom surface that is immediately adjacent to the top surface of the insulator layer 102, 202, 302 and a top surface that is opposite and parallel to the bottom surface. The bus waveguide 110, 210, 310 can, for example, have the same first height as the closed-curve waveguide 120, 220, 320 and parallel sidewalls that extend essentially vertically the full first height (i.e., from the top surface of the insulator layer 102, 202, 302 to the top surface of the waveguide) (as shown). Alternatively, the bus waveguide 110, 210, 310 can have a different height than the closed-curve waveguide 120, 220, 320 and parallel sidewalls that extend essentially vertically to this different height. In any case, the bus waveguide 110, 210, 310 can be positioned laterally adjacent to a section of the outer curved sidewall 121, 221, 321 of the closed-curve waveguide 120, 220, 310 and, more particularly, can be spatially separated from but optically coupled to the closed-curve waveguide 120, 220, 320 at one section of the outer curved sidewall 121, 221, 321.

It should be noted that the section of the outer curved sidewall of the closed-curve waveguide that is optically coupled to the bus waveguide can be a curved section (as illustrated). Alternatively, the section of the outer curved sidewall of the closed-curve waveguide that is optically coupled to the bus waveguide can be a linear section (e.g., in the case of a racetrack shaped closed-curve waveguide) (not shown).

In such a ring resonator, light signals can enter the bus waveguide 110, 210, 310 at the input end 111, 211, 311. Due to optical coupling with the closed-curve waveguide 120, 220, 320, some light signals can pass from the bus waveguide 110, 210, 310 into the closed-curve waveguide 120, 220, 320 and some light signals can pass from the closed-curve waveguide 120, 220, 320 into the bus waveguide 110, 210, 310. More specifically, the bus waveguide and the closed-curve waveguide can be placed sufficiently close to create an evanescent field between the two waveguides and this evanescent field allows some light signals to pass from the bus waveguide to the closed-curve waveguide and vice versa. The creation of such an evanescent field between the adjacent waveguides and thereby the likelihood of the optical coupling of the adjacent waveguides (i.e., coupling that facilitates the transmission of light signals between the adjacent waveguides) is dependent upon at least the distance between the waveguides, the coupling length (i.e., the length of the portions of the adjacent waveguides separated by the distance), and the refractive index of the medium between the waveguides. The closer the distance, the more likely the optical coupling; the longer coupling length, the more likely the optical coupling; etc. In any case, light signals can also exit the bus waveguide 110, 210, 310 at the output end 112, 212, 312. However, within the closed-curve waveguide 120, 220, 320, only light signals of a specific resonant wavelength for that closed-curve waveguide will make repeated roundtrips through the closed-curve waveguide, building up intensity, due to constructive interference. As a result, the light signals that pass from the closed-curve waveguide 120, 220, 320 into the bus waveguide 110, 210, 310 and out at the output end 112, 212, 312 of the bus waveguide 110, 210, 310 will, predominantly, have the specific resonant wavelength. However, as discussed above, closed-curve waveguides are known to be thermally sensitive. That is, they are known to exhibit temperature-dependent resonance shifts (TDRS). The potential TDRS can be, for example, approximately 70 picometers per Kelvin (pm/K) or more.

Therefore, to minimize temperature-dependent resonance shifts (TDRS) in the closed-curve waveguide 120, 220, 320 (i.e., to avoid temperature-dependent variations in the resonant wavelength of the closed-curve waveguide 120, 220, 320) each photonic structure embodiment 100A-100D, 200A-200D, 300A-300B can further include a heating element 140, 240, 340 and a thermal coupler 130, 230, 330, which indirectly thermally couples the heating element 140, 240, 340 to the closed-curve waveguide 120, 220 320 for thermal tuning.

More specifically, each photonic structure embodiment 100A-100D, 200A-200D, 300A-300B can further include a closed-curve thermal coupler 130, 230, 330 with a bottom surface immediately adjacent to the top surface of the insulator layer 102, 202, 302 and a top surface opposite and essentially parallel to the bottom surface. For purposes of this disclosure, a "thermal coupler" refers to a non-contacted passive component made of any suitable non-metallic electrically insulative thermally conductive material through which heat energy can be transmitted without also transmitting electric current. Exemplary thermal coupler materials are discussed in greater detail below with respect to the specific photonic structure embodiments.

The closed-curve thermal coupler 130, 230, 330 can be smaller than the closed-curve waveguide with essentially the same complete loop or ring shape (e.g., a circular ring shape, an oval ring shape, an elliptical ring shape, a racetrack ring shape, etc.) and can further be laterally surrounded by the closed-curve waveguide 120, 220, 320. More specifically, the closed-curve thermal coupler 130, 230, 330 can be positioned laterally adjacent to the inner curved sidewall 122, 222, 322 of the closed-curve waveguide 120, 220, 320 and can abut or at least be sufficiently close to that inner curved sidewall 122, 222, 322 so that it is thermally coupled to the closed-curve waveguide 120, 220, 320. More specifically, the closed-curve thermal coupler can be placed immediately adjacent to or sufficiently close to the inner curved sidewall of the closed-curve waveguide so that heat energy can pass from the closed-curve thermal coupler to the closed-curve waveguide, thereby raising the temperature of the closed-curve waveguide. The likelihood of the thermal coupling of the closed-curve thermal coupler to the closed-curve waveguide depends upon at least the distance between the closed-curve thermal coupler and closed-curve waveguide, the coupling length (length of the portions of the adjacent waveguides separated by the distance), and the thermal conductivity of any medium between the closed-curve thermal conductor and the closed-curve waveguide. The closer the distance, the more likely and the better the thermal coupling; longer coupling length, the more likely and the better the thermal coupling; etc. Furthermore, the closed-curve thermal coupler 130, 230, 330 can have a second height 135, 235, 335 (e.g., as measured from the top surface of the insulator layer 102, 202, 302 to the top of the thermal coupler) that is less than the first height 125, 225, 325 of the closed-curve waveguide 120, 220, 320. In exemplary embodiments, the second height 135, 235, 335 can be less than half the first height. For example, the first height 125, 225, 325 of the closed-curve optical waveguide 120, 220, 320 could be 220 nm and the second height 135, 235, 335 of the adjacent closed-curve thermal coupler 130, 230, 330 can be 100 nm. Thus, in each of the photonic structure embodiments, the closed-curve thermal coupler 130, 230, 330 is positioned laterally adjacent to the lower portion only of the inner curved sidewall 122, 222, 322 of the closed-curve waveguide 120, 220, 320 such that the inner curved sidewall 122, 222, 322 extends vertically above the level of the top surface of the closed-curve thermal coupler 130, 230, 330.

Each photonic structure embodiment 100A-100D, 200A-200D, 300A-300B can further include a heating element 140, 240, 340 and at least two contacts 149, 249, 349 on the heating element 140, 240, 340. For purposes of this disclosure, a "heating element" refers to a resistor made of any suitable conductive material through which electric current flows in response to a voltage differential at the contacts and is converted into heat energy. Those skilled in the art will recognize that the direction and amount of current flow will depend upon the voltage differential. Furthermore, the amount of heat generated per unit length will depend upon the material used and the current density (which is a function of the cross-sectional area of the heating element). Exemplary heating element materials are discussed in greater detail below with regard to the specific embodiments. In any case, the heating element 140, 240, 340 can be spatially separated from the closed-curve waveguide 120, 220, 320. The heating element 140, 240, 340 can further be adjacent to the closed-curve thermal coupler 130, 230, 330 and, more particularly, can abut or at least be sufficiently close to the closed-curve thermal coupler 130, 230, 330 so that it, like the closed-curve waveguide, is thermally coupled to the closed-curve thermal coupler 130, 230, 330. That is, the heating element can be placed immediately adjacent to or sufficiently close to the closed-curve thermal coupler so that heat energy can pass from the heating element to and through the closed-curve thermal coupler to raise the temperature of the closed-curve thermal coupler. The likelihood of the thermal coupling of the closed-curve thermal coupler to the closed-curve waveguide depends upon at least the distance between the closed-curve thermal coupler and closed-curve waveguide, the coupling length (length of the portions of the adjacent waveguides separated by the distance), and the thermal conductivity of any medium between the closed-curve thermal conductor and the closed-curve waveguide. The closer the distance, the more likely and the better the thermal coupling; longer coupling length, the more likely and the better the thermal coupling; etc. It should be noted that, due to similar thermal coupling between the closed-curve thermal coupler and the closed-curve waveguide, the heat energy can further pass from the closed-curve thermal coupler into the closed-curve thermal waveguide to raise the temperature of the closed-curve waveguide. Thus, the heating element 140, 240, 340 is indirectly thermally coupled to closed-curve waveguide 120, 220, 320 via the closed-curve thermal coupler 130, 230, 330 and can be used to thermally tune the closed-curve waveguide 120, 220, 320 via the closed-curve thermal coupler 130, 230, 330 in order to minimize any temperature-dependent resonance shift (TDRS). In other words, heat energy can be generated and output by the heating element 140, 240, 340 and, due to thermal coupling, can be passed into the closed-curve thermal coupler 130, 230, 330, can travel through the closed-curve thermal coupler 130, 230, 330, and can pass from the closed-curve thermal coupler 130, 230, 330 into the lower portion of the closed-curve waveguide 120, 220, 320. That is, heat energy can be transferred from the heating element through the closed-curve thermal coupler and into the closed-curve thermal waveguide. The amount of heat energy can be predetermined to ensure that the temperature of the closed-curve waveguide 120, 220, 320 is maintained at a specific temperature or within a specific temperature range so as to ensure that light signals of the specific resonant wavelength will build up intensity as they make repeated roundtrips through the closed-curve waveguide 120, 220, 320.

The various photonic structure embodiments 100A-100D, 200A-200D, 300A-300B disclosed herein vary with regard to the materials used for the different components (e.g., for the waveguide(s), the thermal coupler, and the heating element) and/or with regard to the relative placement of the different components (e.g., the waveguide(s), the thermal coupler, and the heating element).

For example, referring to FIG. 1 and FIGS. 1A-1D, in the photonic structure embodiments 100A-100D, the heating element 140 can be at the same design level as the closed-curve thermal coupler 130 and the closed-curve waveguide 120. Furthermore, the closed-curve thermal coupler 130 can be positioned laterally between and immediately adjacent to both the closed-curve waveguide 120 and the heating element 140 to be thermally coupled to both the closed-curve waveguide 120 and the heating element 140.

More specifically, in the photonic structure embodiments 100A-100D, the heating element 140 can have a bottom surface immediately adjacent to the top surface of the insulator layer 102. The heating element 140 can be smaller than the closed-curve thermal coupler 130 with essentially the same loop or ring shape (e.g., a circular ring shape, an oval ring shape, an elliptical ring shape, a racetrack ring shape, etc.) and can further be laterally surrounded by and immediately adjacent to an inner curved sidewall of the closed-curve thermal coupler 130 such that these three components (i.e., the closed-curve waveguide 120, the closed-curve thermal coupler 130 and the heating element 140) essentially form concentric, abutting, ring shapes.

It should be noted that the heating element 140 can be a complete loop or ring shape with no discrete ends (as shown). Alternatively, the heating element 140 could have at least one small segment removed so as to have an open-loop or ring shape with discrete ends (not shown). Alternatively, heating element 140 could be segmented with the segments forming the loop or ring shape and with each segment having discrete contacted ends (e.g., so that different amounts of heat energy could be applied to different portions of the closed-curve thermal coupler and thereby to different portions of the closed-curve waveguide) (not shown).

In the photonic structure embodiment 100A (see FIG. 1A), the closed-curve waveguide 120, the closed-curve thermal coupler 130, and the heating element 140 can include continuous portions 103.1-103.3 of the same semiconductor layer 103 on the insulator layer 102. That is, the closed-curve waveguide 120 can be a first portion 103.1 of the semiconductor layer 103, which has a first thickness (i.e., see the first height 125). The closed-curve thermal coupler 130 can be a second portion 103.2 of the semiconductor layer 103 (also referred to herein as a recessed portion or slab portion), which is continuous with the first portion 103.1 but which has been recessed (i.e., etched back) so as to have a second thickness (i.e., see the second height 135) that is less than the first portion (i.e., the second portion 103.2 is thinner than the first portion 103.2). The heating element 140 can include a third portion 103.3 of the semiconductor layer 103, which is continuous with the second portion 103.2, and can further include a metal silicide layer 145 on the third portion 103.3. The semiconductor layer 103 can be, for example, a silicon layer. Alternatively, the semiconductor layer could be some other type of semiconductor layer suitable for optical waveguide formation and having a temperature-dependent refractive index including, but not limited to, a polysilicon layer, a germanium layer, or a silicon germanium layer. The metal silicide layer 145 can be, for example, a cobalt silicide (CoSi) layer, a nickel silicide (NiSi) layer, a tungsten silicide (WSi) layer, a titanium silicide (TiSi) layer, or any other suitable metal silicide layer. Optionally, the metal silicide layer 145 could be doped with N-type or P-type dopants for reduced resistance.

In the photonic structure embodiment 100B (see FIG. 1B), the closed-curve waveguide 120 and the closed-curve thermal coupler 130 can be continuous portions 103.1-103.2 of the same semiconductor layer 103 (e.g., the same silicon layer or, alternatively, the same polysilicon, germanium, or silicon germanium layer, as described above with respect to the photonic structure embodiment 100A). However, in this case, the heating element 140 can be some other metal or metal alloy resistive element 141 formed on the insulator layer 102 abutting the inner curved sidewall of the closed-curve thermal coupler 130. This resistive element 141 can be made, for example, of tungsten, aluminum, nickel, titanium, tantalum, cobalt, copper, or alloys thereof.

In the photonic structure embodiments 100C (see FIG. 1C) and 100D (see FIG. 1D), the closed-curve waveguide 120 can include a discrete portion 103.1 of a semiconductor layer 103 (e.g., a silicon layer or, alternatively, a polysilicon, germanium, or silicon germanium layer, as described above with respect to the photonic structure embodiment 100A). The closed-curve thermal coupler 130 can be some other non-metallic electrically insulative thermally conductive feature 104 formed on the insulator layer 102 and positioned laterally between and abutting the closed-curve waveguide 120 and the heating element 140. For example, the closed-curve thermal coupler 130 could be a thin layer of polysilicon, silicon, nitride, boron nitride, silicon carbide, or diamond on the insulator layer 102 and extending laterally between and abutting the closed-curve waveguide 120 and the heating element 140. The heating element 140 can include another discrete portion 103.3 of the semiconductor layer 103 positioned laterally immediately adjacent to the closed-curve thermal coupler 130 and can further include a metal silicide layer 145 on the discrete patterned portion 103.3 of the semiconductor layer, as described above with respect to the photonic structure embodiment 100A (e.g., see the photonic structure embodiment 100C of FIG. 1C). Alternatively, the heating element 140 can be some other metal or metal alloy resistive element 141 formed on the insulator layer 102 abutting the closed-curve thermal coupler 130, as described above with respect to the photonic structure embodiment 100B (e.g., see the photonic structure embodiment 100D of FIG. 1D).

In each of the photonic structure embodiments 100A-100D, the optical device 199 can be a ring resonator. The ring resonator can include at least one closed-curve waveguide 120 and at least one bus waveguide 110 adjacent to the closed-curve waveguide 120. In this case, the bus waveguide can be a discrete portion 103.4 of the semiconductor layer 103, which is adjacent to but spatially separated from the closed-curve waveguide 120 (i.e., from the first portion 103.1 of the semiconductor layer 103) and optically coupled thereto.

Referring to FIG. 2 and FIGS. 2A-2D, in the photonic structure embodiments 200A-200D, the heating element 240 can be at the same design level as the closed-curve thermal coupler 230 and the closed-curve waveguide 220. Furthermore, the closed-curve thermal coupler 230 can be positioned laterally between the closed-curve waveguide 220 and the heating element 240. However, in this case, the closed-curve thermal coupler 230 can be physically separated from the closed-curve waveguide 220 and/or from the heating element 240 by space(s) 250. It should be understood that the distances between the closed-curve thermal coupler 230 and the closed-curve waveguide 220 and the heating element 240 (i.e., the widths of any space(s) 250) should be sufficiently small to ensure so that the closed-curve thermal coupler 230 is still thermally coupled to both closed-curve waveguide 220 on one side and the heating element 240 on the other.

More particularly, in the photonic structure embodiments 200A-200D, the heating element 240 can have a bottom surface immediately adjacent to the top surface of the insulator layer 202. The heating element 240 can be smaller than the closed-curve thermal coupler 230 with essentially the same loop or ring shape (e.g., a circular ring shape, an oval ring shape, an elliptical ring shape, a racetrack ring shape, etc.) and can further be laterally surrounded by the closed-curve thermal coupler 230 such that these three components (i.e., the closed-curve waveguide 220, the closed-curve thermal coupler 230 and the heating element 240) essentially form concentric ring shapes with at least two of these three ring shapes being separated by a space 250.

It should be noted that the heating element 240 can be a complete loop or ring shape with no discrete ends (as shown). Alternatively, the heating element 240 could have at least one small segment removed so as to have an open-loop or ring shape with discrete ends (not shown). Alternatively, heating element 240 could be segmented with the segments forming the loop or ring shape and with each segment having discrete contacted ends (e.g., so that different amounts of heat energy could be applied to different portions of the closed-curve thermal coupler and thereby to different portions of the closed-curve waveguide) (not shown).

For purposes of illustration FIGS. 2A-2D only show a single space 250 between the closed-curve thermal coupler 230 and the heating element 240. It should be understood that, alternatively, a space 250 could be between the closed-curve waveguide 220 and the closed-curve thermal coupler 230 but not between the closed-curve thermal coupler 230 and the heating element 240 or spaces 250 could be between the closed-curve thermal coupler 230 and both the closed-curve waveguide 220 and the heating element 240.

In the photonic structure embodiment 200A (see FIG. 2A), the closed-curve waveguide 220 and the closed-curve thermal coupler 230 can be continuous portions 203.1-203.2 of the same semiconductor layer 203 on the insulator layer 202. That is, the closed-curve waveguide 220 can be a first portion 203.1 of the semiconductor layer 203, which has a first thickness (i.e., see the first height 225). The closed-curve thermal coupler 230 can be a second portion 203.2 of the semiconductor layer 203 (also referred to herein as a recessed portion or slab portion), which is continuous with the first portion 203.1 but which has been recessed (i.e., etched back) so as to have a second thickness (i.e., see the second height 235) that is less than the first portion (i.e., the second portion 203.2 is thinner than the first portion 203.2). The heating element 240 can include a third portion 203.3 of the semiconductor layer 203, which is physically separated from the second portion 203.2 by a space 250 and can further include a metal silicide layer 245 on the third portion 203.3.

The semiconductor layer 203 can be, for example, a silicon layer. Alternatively, the semiconductor layer could be some other type of semiconductor layer suitable for optical waveguide formation and having a temperature-dependent refractive index including, but not limited to, a polysilicon layer, a germanium layer, or a silicon germanium layer. The metal silicide layer 245 can be, for example, a cobalt silicide (CoSi) layer, a nickel silicide (NiSi) layer, a tungsten silicide (WSi) layer, a titanium silicide (TiSi) layer, or any other suitable metal silicide layer. Optionally, the metal silicide layer 145 could be doped with N-type or P-type dopants for reduced resistance.

In the photonic structure embodiment 200B (see FIG. 2B), the closed-curve waveguide 220 and the closed-curve thermal coupler 230 can be continuous portions 203.1-203.2 of the same semiconductor layer 203 (e.g., the same silicon layer or, alternatively, the same polysilicon, germanium, or silicon germanium layer, as described above with respect to the photonic structure embodiment 200A). However, in this case, the heating element 240 can be some other metal or metal alloy resistive element 241 formed on the insulator layer 202 and physically separated from the closed-curve thermal coupler 230 by a space 250. The resistive element 241 can be made, for example, of tungsten, aluminum, nickel, titanium, tantalum, cobalt, copper, or alloys thereof.

In the photonic structure embodiments 200C (see FIG. 2C) and 200D (see FIG. 2D), the closed-curve waveguide 220 can be a discrete portion 203.1 of a semiconductor layer 203 (e.g., a silicon layer or, alternatively, a polysilicon, germanium, or silicon germanium layer, as described above with respect to the photonic structure embodiment 200A). The closed-curve thermal coupler 230 can be some other non-metallic electrically insulative thermally conductive feature formed on the insulator layer 202 positioned laterally between the closed-curve waveguide 220 and the heating element 240 and separated from one or both by space(s) 250. Each space 250 can be sufficiently small such that the closed-curve thermal coupler 230 is still thermally coupled to both the closed-curve waveguide 220 and the heating element 240. In this case, the closed-curve thermal coupler 230 (i.e., the non-metallic electrically insulative thermally conductive feature) can be, for example, a thin layer of polysilicon, silicon, nitride, boron nitride, silicon carbide, diamond or some other non-metallic electrically insulative thermally conductive material on the insulator layer 202 between the closed-curve waveguide 220 and the heating element 240. The heating element 240 can include a discrete portion 203.3 of the semiconductor layer 203 (e.g., positioned laterally immediately adjacent to the closed-curve thermal coupler 230 but separated therefrom by a space 250) and can further include a metal silicide layer 245 on the discrete patterned portion 203.3 of the semiconductor layer 203, as described above with respect to the photonic structure embodiment 200A (e.g., see the photonic structure embodiment 200C of FIG. 2C). Alternatively, the heating element 240 can be some other metal or metal alloy resistive element 241 formed on the insulator layer 202 adjacent to the closed-curve thermal coupler 230 but separated therefrom by a space 250, as described above with respect to the photonic structure embodiment 200B (e.g., see the photonic structure embodiment 200D of FIG. 2D).

In each of the photonic structure embodiments 200A-200D, the optical device 299 can be a ring resonator. The ring resonator can include at least one closed-curve waveguide 220 and at least one bus waveguide 210 adjacent to the closed-curve waveguide 220. In this case, the bus waveguide 210 can be a discrete portion 203.4 of the semiconductor layer 203, which is adjacent to but spatially separated from the closed-curve waveguide 220 (i.e., from the first portion 203.1 of the semiconductor layer 203) and optically coupled thereto.

Figure 3:
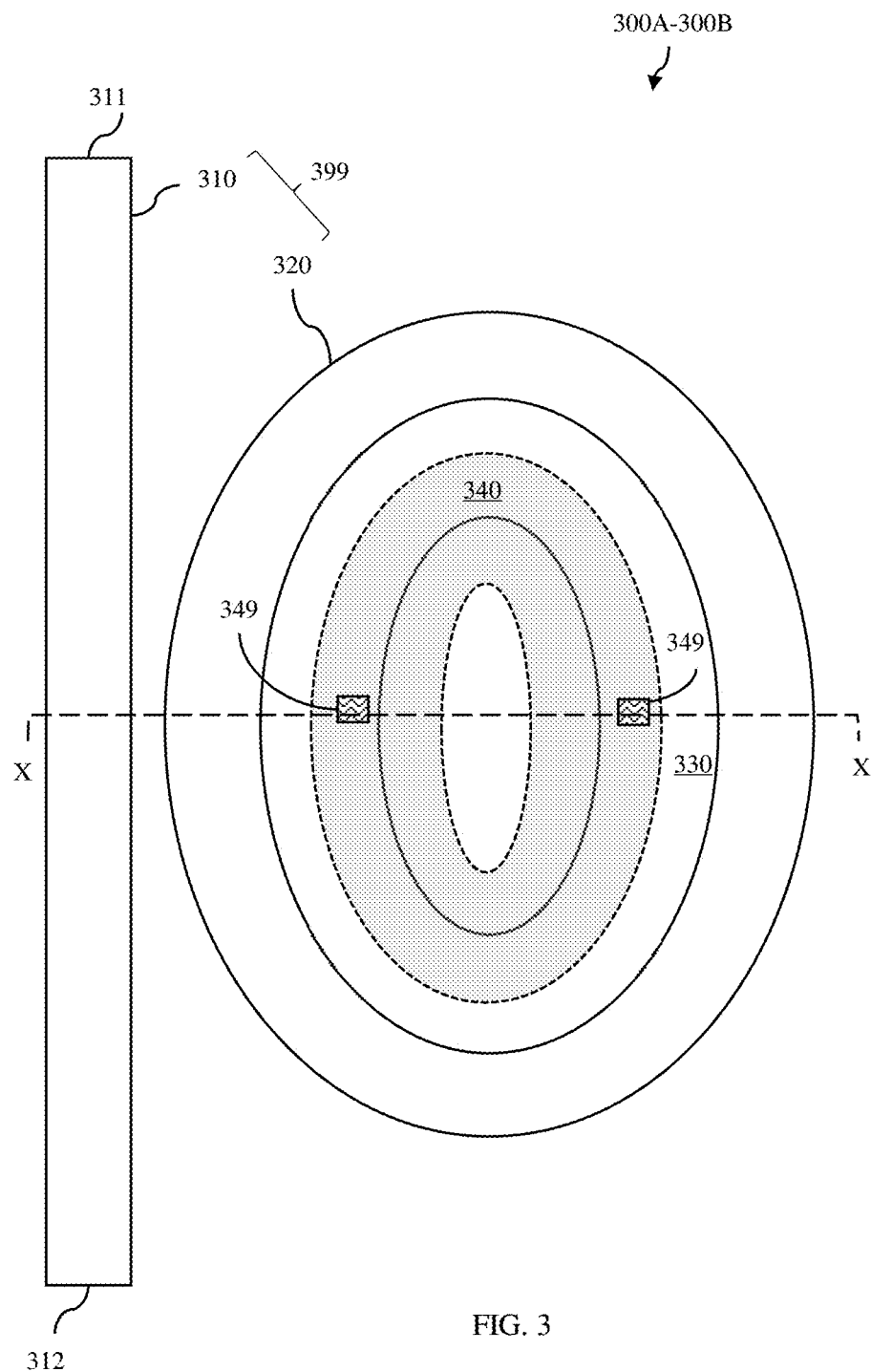
FIG. 3 is a layout diagram of yet another photonic structure.
Figure 3A:
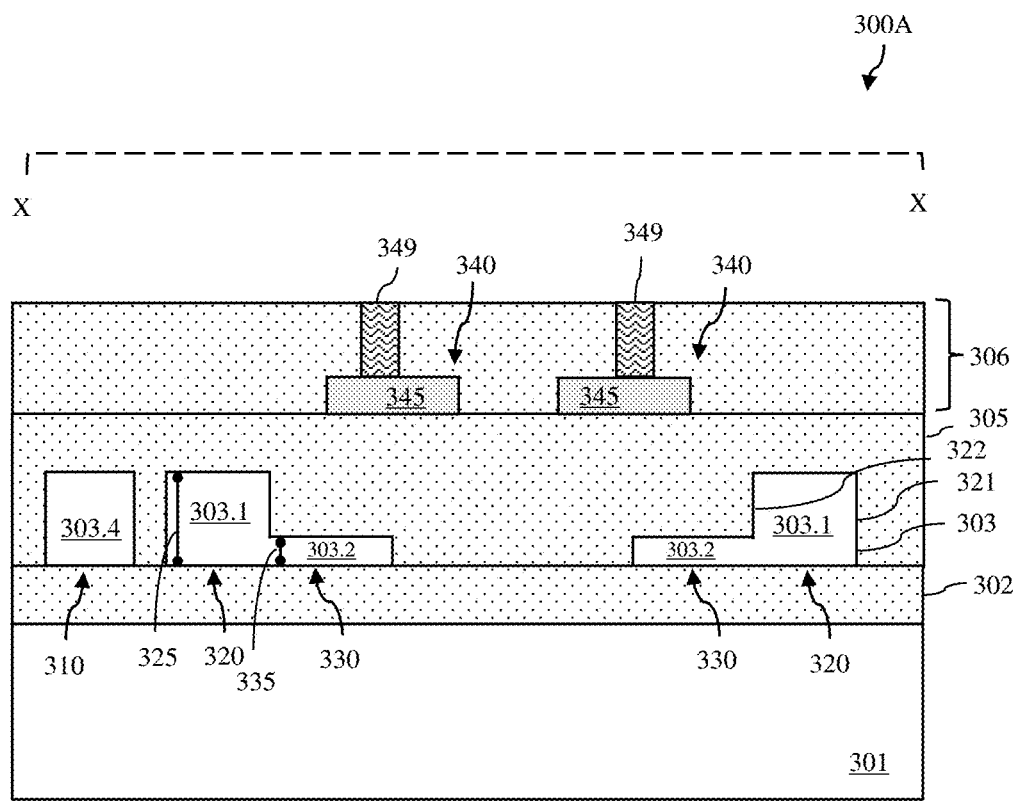
FIGS. 3A-3B are cross-section diagrams illustrating alternative embodiments of the photonic structure shown FIG. 3.
Figure 3B:
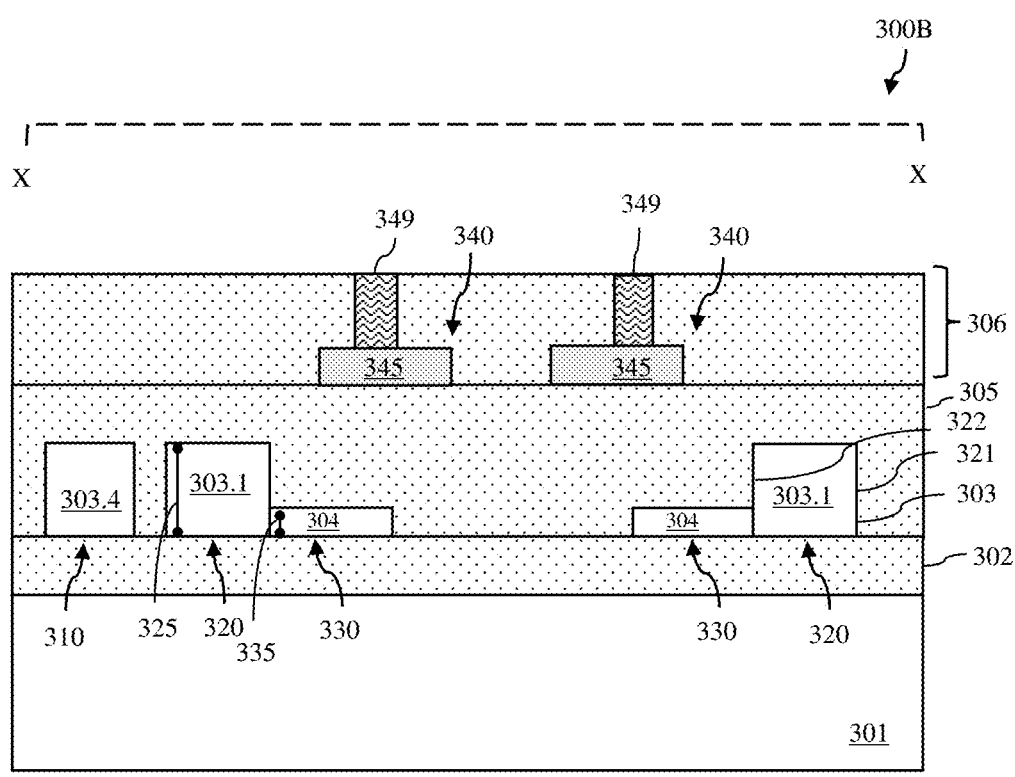

Referring to FIG. 3 and FIGS. 3A-3B, in the photonic structure embodiments 300A-300B, the heating element 340 can be at a different design level than the closed-curve thermal coupler 330 and the closed-curve waveguide 320.

More specifically, in the photonic structure embodiments 300A-300B, the heating element 340 can have a bottom surface, which is above and physically separated from the top surface of the insulator layer 302, as shown. For example, the heating element 340 could be a metal or metal alloy resistive element 345 in a back end of the line (BEOL) metal level 306. For example, the heating element 340 could be made of coper or aluminum or some other BEOL metal material. Alternatively, the heating element 340 could be below the insulator layer 302 (not shown). For example, the heating element 340 could be a metal or metal alloy resistive element embedded in the substrate 301) (not shown). In any case, the heating element 340 can have essentially the same general loop or ring shape as the closed-curve thermal coupler and the closed-curve waveguide and can be aligned with and sufficiently close to the closed-curve thermal coupler 330 so as to be thermally coupled thereto. The heating element 340 can be a complete loop or ring shape with no discrete ends. Alternatively, the heating element 340 could have at least one small segment removed so as to have an open-loop or ring shape with discrete ends (not shown). Alternatively, heating element 340 could be segmented with the segments forming the loop or ring shape and with each segment having discrete contacted ends (e.g., so that different amounts of heat energy could be applied to different portions of the closed-curve thermal coupler and thereby to different portions of the closed-curve waveguide) (not shown). For purposes of illustration, the heating element 340 is shown as extending partially over the closed-curve thermal coupler 330. However, alternatively, the heating element 340 could extend completely over the closed-curve thermal coupler or could be completely offset from the closed-curve thermal coupler.

In the photonic structure embodiment 300A (see FIG. 3A), the closed-curve waveguide 320 and the closed-curve thermal coupler 330 each include different continuous portions of the same semiconductor layer 303 on the insulator layer 302. That is, the closed-curve waveguide 320 can be a patterned first portion 303.1 of the semiconductor layer 303, which has a first thickness (i.e., see the first height 325). The closed-curve thermal coupler 330 can be a patterned second portion 303.2 of the semiconductor layer 303 (also referred to herein as a recessed portion or slab portion), which is continuous with the first portion 303.1 but which has been recessed (i.e., etched back) so as to have a second thickness (i.e., see the second height 335) that is less than the first portion (i.e., the second portion 303.2 is thinner than the first portion 303.2). The bus waveguide 310 can be a discrete patterned portion 303.4 of the semiconductor layer 303, which also has the first thickness. The semiconductor layer 303 can be, for example, a silicon layer. Alternatively, the semiconductor layer could be some other type of semiconductor layer suitable for optical waveguide formation and having a temperature-dependent refractive index including, but not limited to, a polysilicon layer, a germanium layer, or a silicon germanium layer.

In the photonic structure embodiments 300B (see FIG. 3B), the closed-curve waveguide 320 and the bus waveguide 310 can be discrete patterned portions 303.1 and 303.4, respectively, of the same semiconductor layer 303. The closed-curve thermal coupler 330 can be some other non-metallic electrically insulative thermally conductive feature formed on the insulator layer 302 positioned laterally adjacent to and abutting the closed-curve waveguide 320. For example, the closed-curve thermal coupler 330 could be a thin layer of polysilicon, silicon, nitride, boron nitride, silicon carbide, or diamond on the insulator layer 302 positioned laterally adjacent to and abutting the closed-curve waveguide 320.

In any case, each of the photonic structure embodiments 100A-100D, 200A-200D, 300A-300B can further include one or more layers of dielectric material 105, 205, 305 covering exposed surfaces of the insulator layer 102, 202, 302 and any device components thereon. For example, the layer(s) of dielectric material can cover the optical device 199, 299, 399 (including the closed-curve waveguide 120, 220, 320 and, if applicable, the bus waveguide 110, 210, 310), the closed-curve thermal coupler 130, 230, 330 and, if applicable, the heating element (e.g., see heating element 140 and 240) and any spacers therebetween. That is, the dielectric material can fill any spaces between the bus waveguide and the closed-curve waveguide, between the closed-curve waveguide and the closed-curve thermal coupler, and/or between the closed-curve thermal coupler and the heating element. This dielectric material 105, 205, 305 and, particularly, the dielectric material that is immediately adjacent to the optical waveguide(s) (i.e., immediately adjacent to the closed-curve waveguide 120, 220, 320 and the bus waveguide 110, 210, 310, if applicable) can be any dielectric material that is suitable for use as cladding material for those optical waveguide(s). For example, if the optical waveguide(s) are silicon waveguide(s), which as discussed above can has a temperature and wavelength-dependent refractive index that is typically above 3.2, then the layer of dielectric material 105, 205, 305 that is immediately adjacent to those optical waveguide(s) could be silicon dioxide (e.g., with a refractive index of less than 1.6), silicon nitride (e.g., with a refractive index of less than 2.1), or any other suitable dielectric material that has a refractive index that is less than the lowest refractive index of silicon.

In each of the photonic structure embodiments 100A-100D, 200A-200D, 300A-300B, described above and illustrated in the drawings, the optical device 199, 299, 399 is shown as being a simple ring resonator that includes a single bus waveguide 110, 210, 310 and a single closed-curve waveguide 120, 220, 320. However, it should be understood that the figures are not intended to be limiting. Alternatively, the optical device 199, 299, 399 could be a ring resonator with some other more complex configuration (e.g., multiple closed-curve waveguides optically coupled to the same bus waveguide, a single closed-curve waveguide between and optically coupled to a pair of parallel bus waveguides, multiple closed-curve waveguides between and optically coupled to a pair of parallel bus waveguides, etc.). In such complex ring resonator configurations, each closed-curve waveguide can be indirectly thermally coupled to a corresponding heating element via a corresponding closed-curve thermal coupler, as described above.

Finally, as mentioned above, in each of the photonic structure embodiments 100A-100D, 200A-200D, 300A-300B, the outer curved sidewall 121, 221, 321 of the closed-curve waveguide 120, 220, 320 extends essentially vertically the full first height 125, 225, 325 of the closed-curve waveguide from the top surface of the insulator layer 102, 202, 302 to the top surface of the waveguide itself. As a result, mode confinement is improved, and signal loss is minimized. More particularly, conventional waveguides are typically either strip or rib waveguides. A strip waveguide refers to a waveguide that is formed, for example, by forming a mask with the desired shape on a waveguide core material layer and then performing an anisotropic etch process to etch completely through the waveguide core material layer so that all sidewalls of the resulting waveguide extend vertically the full height of the waveguide. A rib waveguide refers to a waveguide that is formed, for example, by forming a mask with the desired shape on a waveguide core material layer and then performing an anisotropic etch process to etch only partially through a waveguide core material layer so that recessed portions (also referred to as slab portions) of the waveguide core material extend laterally away from a lower portion of the resulting waveguide and so that the sidewalls of the resulting waveguide do not extend the full height of the waveguide but instead only extend from vertically from the recessed portion of the waveguide core material. Thus, a rib waveguide essentially has an inverted T-shape. The recessed portions of the waveguide core material in a rib waveguide allow for light signal leakage. Furthermore, in closed-curve rib waveguides, the potential for light signal leakage is greater along the outer curved sidewall. Thus, by eliminating recessed portions of waveguide core material (e.g., silicon or, alternatively, polysilicon, germanium or silicon germanium) at least along the outer curved sidewall 121, 221, 321 of the closed-curve waveguide 120, 220, 320 in each of the photonic structure embodiments 100A-100D, 200A-200D, 300A-300B, mode confinement is improved and signal loss is minimized at least to some extent even in embodiments where the closed-curve thermal coupler 130, 230, 330 is a continuous, but recessed, portion 103.2, 203.2, 303.2 of same semiconductor layer 103, 203, 303 (e.g., the same silicon layer or, alternatively, the same polysilicon, germanium or silicon germanium layer) used to form the closed-curve waveguide 120, 220, 320 (e.g., as in the photonic structure embodiments 100A-100B of FIGS. 1A-1B, 200A-200B of FIGS. 2A-2B and 300A of FIG. 3B).

Figure 1A:
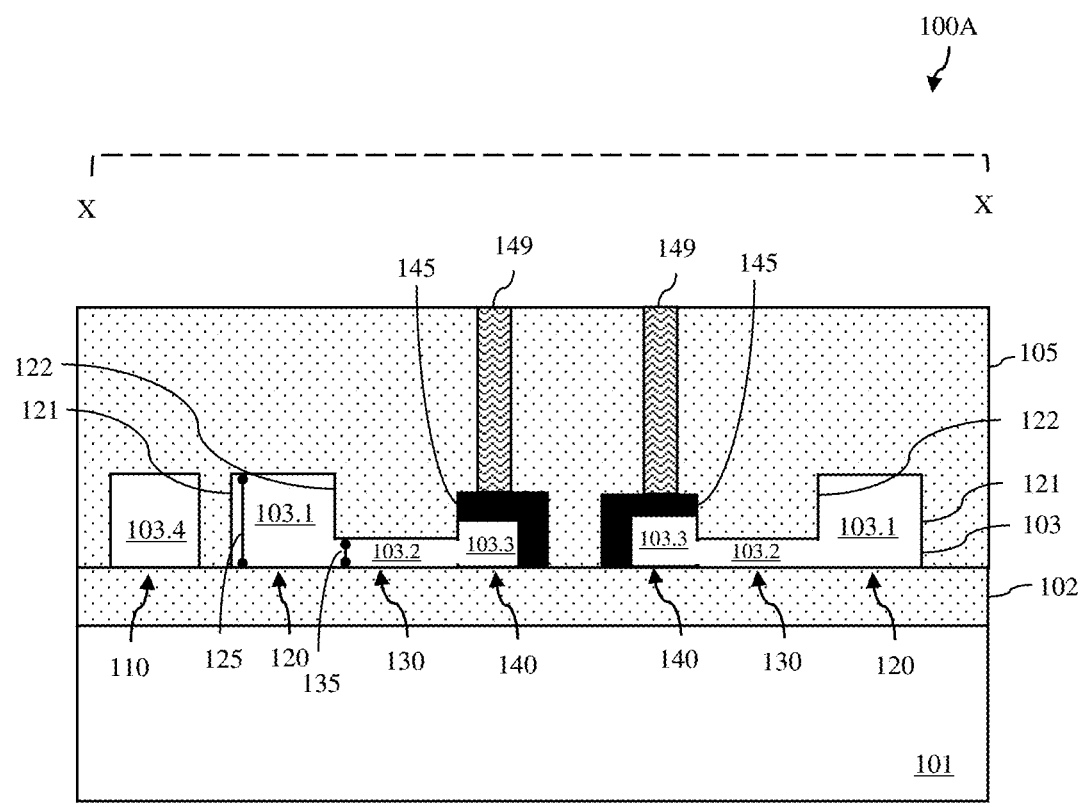
FIGS. 1A-1D are cross-section diagrams illustrating alternative embodiments of the photonic structure shown in FIG. 1.
Figure 1B:
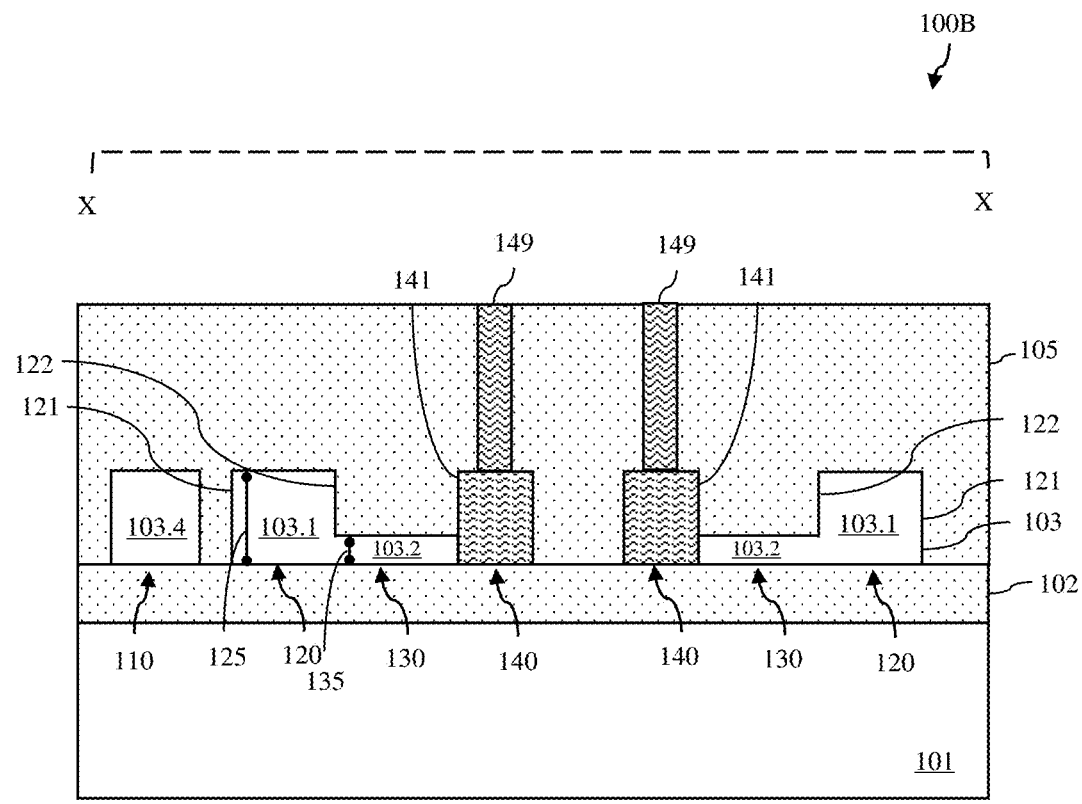
Figure 1C:
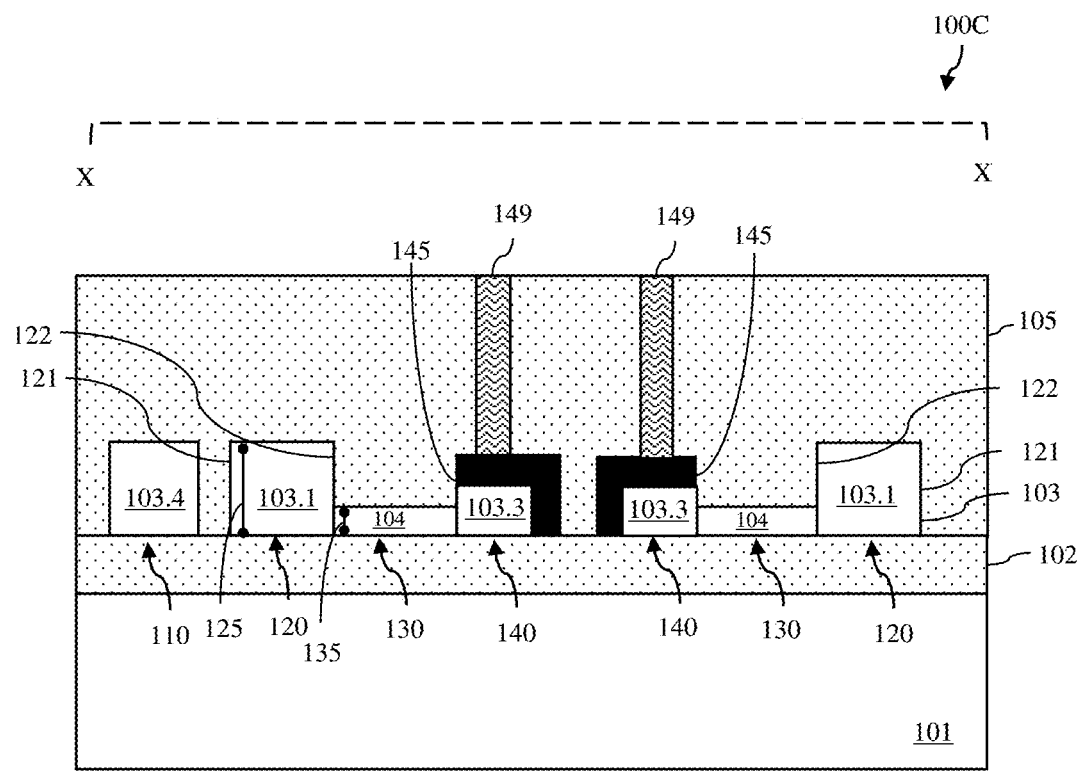
Figure 1D:
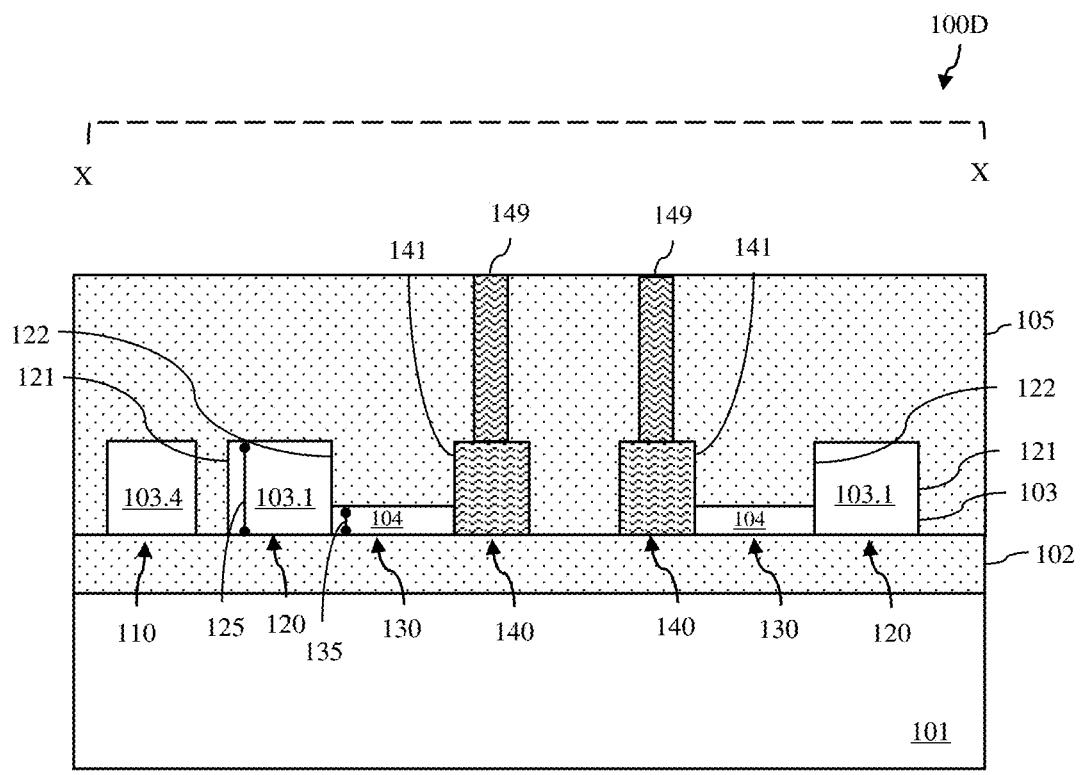
Figure 2:
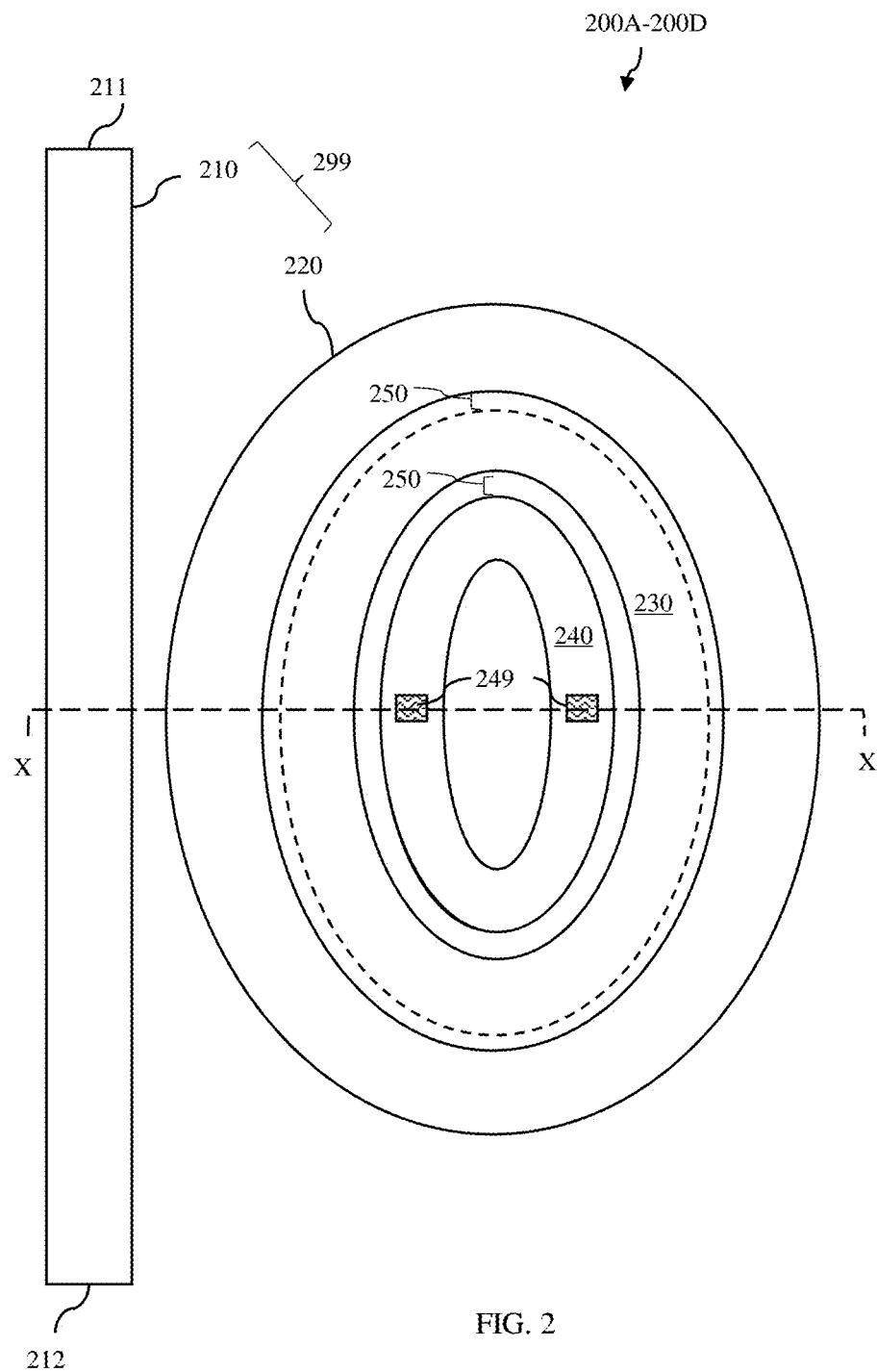
FIG. 2 is a layout diagram of another photonic structure.
Figure 2A:
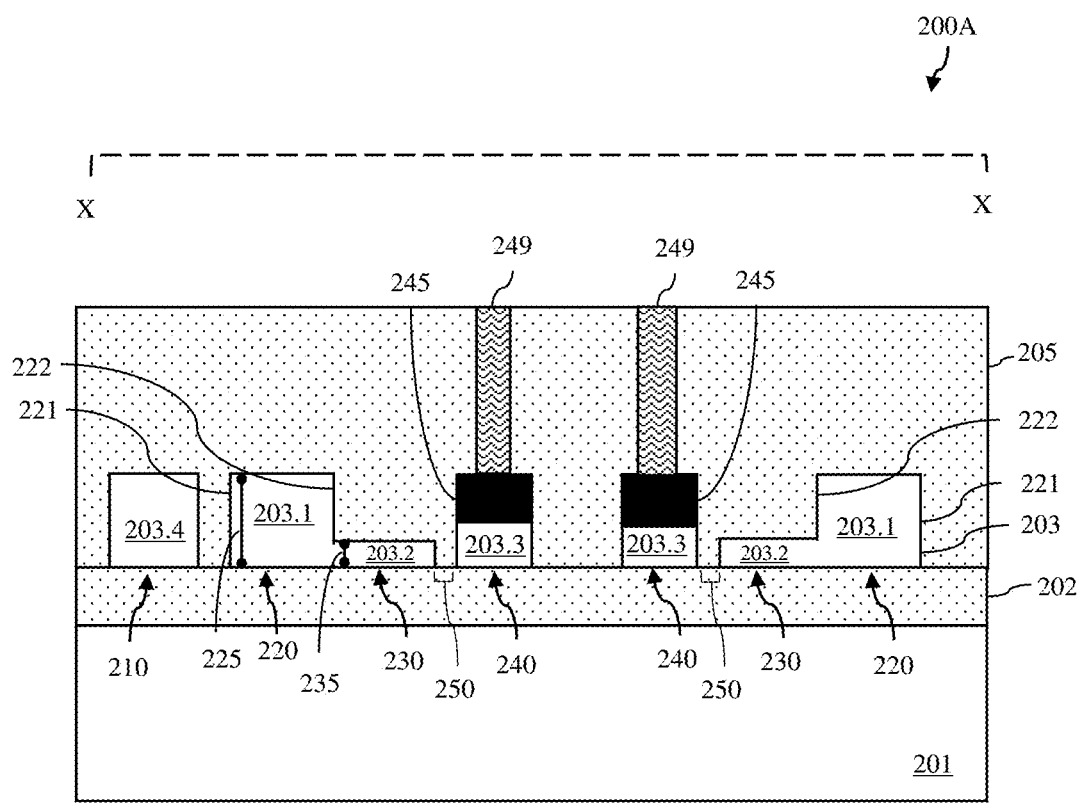
FIGS. 2A-2D are cross-section diagrams illustrating alternative embodiments of the photonic structure shown in FIG. 2.
Figure 2B:
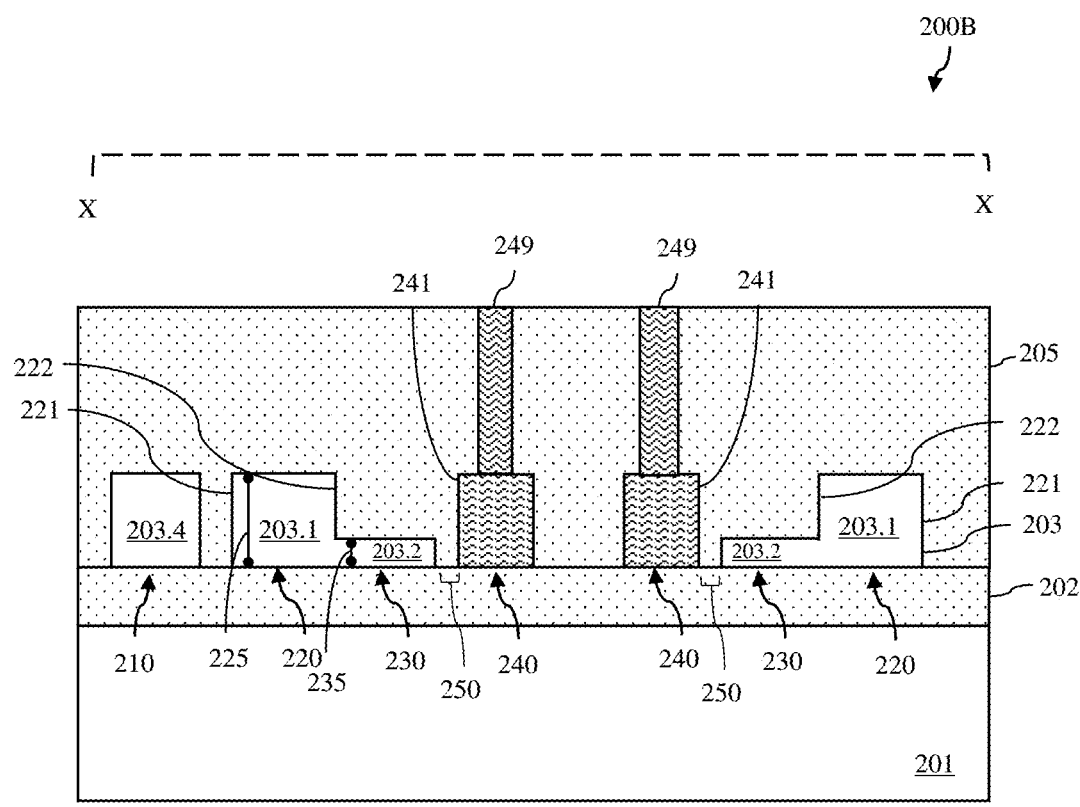
Figure 2C:
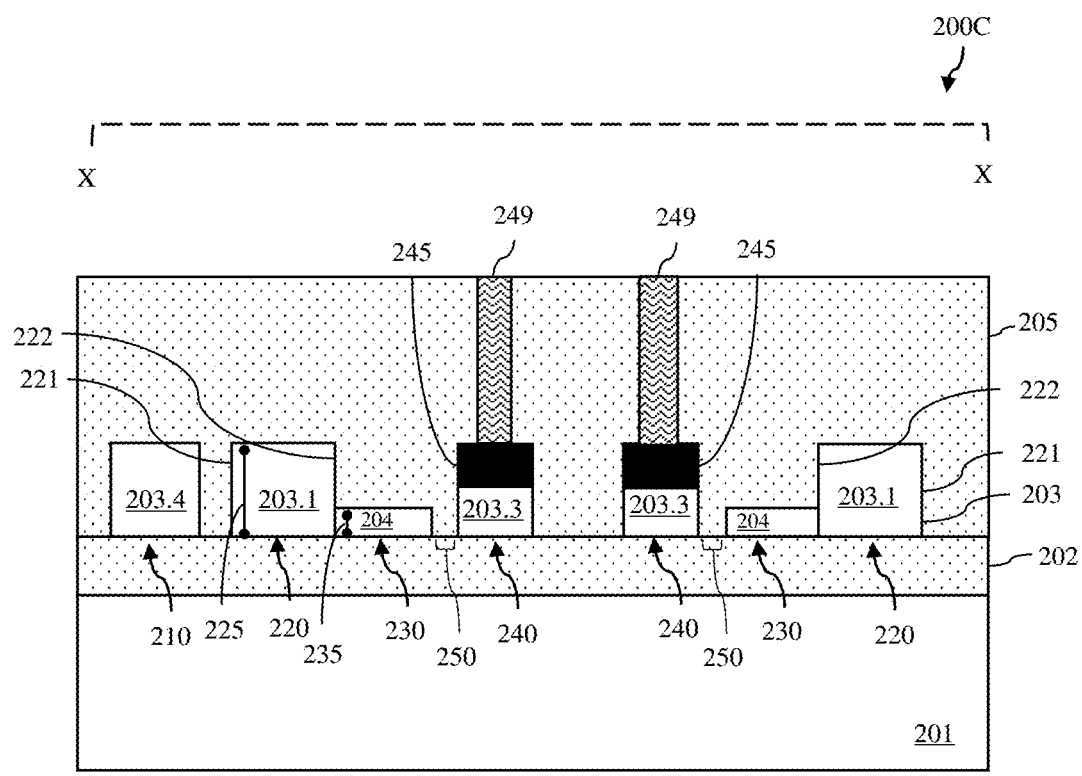
Figure 2D:
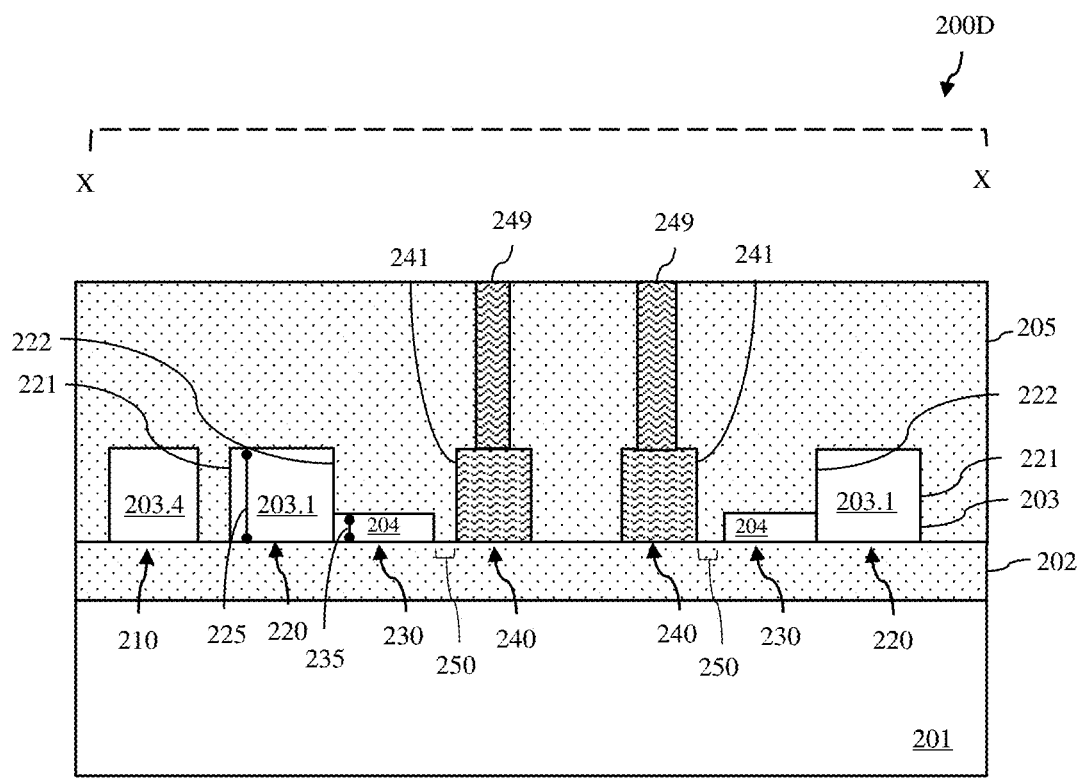
Figure 4:
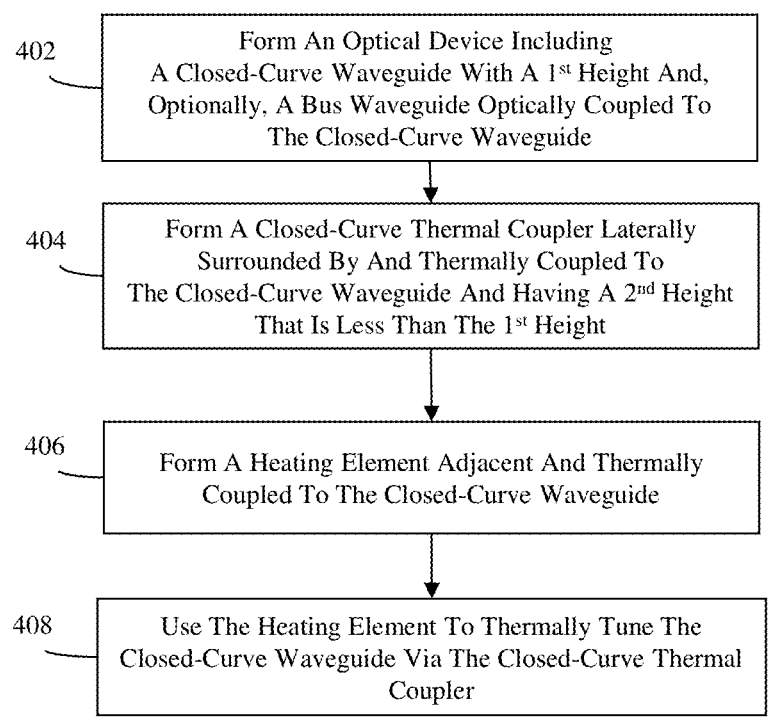
FIG. 4 is a flow diagram illustrating method embodiments for forming a photonic structure.

Referring to the flow diagram of FIG. 4, also disclosed herein are embodiments of a method of forming the above-described photonic structure embodiments (e.g., see the photonic structure embodiments 100A-100D shown in the layout diagram of FIG. 1 and further illustrated in the alternative cross-section diagrams of FIGS. 1A-1D, respectively; see the photonic structure embodiments 200A-200D shown in the layout diagram of FIG. 2 and further illustrated the alternative cross-section diagrams of FIGS. 2A-2D, respectively; and see the photonic structure embodiments 300A-300B shown in the layout diagram of FIG. 3 and further illustrated in the alternative cross-section diagrams of FIGS. 3A-3B).

Generally, the method embodiments can include forming an optical device 199, 299, 399 on an insulator layer 102, 202, 302 (see process step 402). The process of forming the optical device 199, 299, 399 can include at least forming a closed-curve waveguide 120, 220, 320. For example, in some embodiments, the process of forming the optical device 199, 299, 399 can include forming a ring resonator, which includes at least one bus waveguide 110, 210, 310 and at least one closed-curve waveguide 120, 220, 320 that is positioned laterally adjacent and optically coupled to the bus waveguide 110, 210, 310. As mentioned above, for purposes of this disclosure, a bus waveguide refers to a waveguide with discrete ends including an input end and an output end, whereas a closed-curve waveguide refers to a waveguide with a complete loop or ring shape with no discrete ends. In any case, the closed-curve waveguide 120, 220, 320 of the optical device 199, 299, 399 can be formed at process step 402 so as to have a first height 125, 225, 325 (e.g., as measured from a top surface of an insulator layer to a top surface of the closed-curve waveguide), an outer curved sidewall 121, 221, 321 that extends essentially vertically the full first height of the closed-curve waveguide (e.g., in order to improve mode confinement and minimize signal loss), and an inner curved sidewall 122, 222, 322 opposite the outer curved sidewall. Furthermore, the dimensions of the closed-curve waveguide 120, 220, 320 can be customized to achieve desired results. For example, the height and width of the closed-curved waveguide can be customized to facilitate propagation of light signals having wavelengths within a given wavelength range. Furthermore, the circumference of the closed-curve waveguide can be customized to achieve a specific resonant wavelength and to set how often resonance occurs. As mentioned above, the resonant wavelength of a closed-curve waveguide refers to the wavelength of light signals that will make repeated roundtrips through the closed-curve waveguide, building up intensity. Techniques for customizing the dimensions of waveguides are well known in the art and, thus, the details have been omitted from this specification in order to allow the reader to focus on the salient aspects of the disclosed embodiments.

The method can further include forming a closed-curve thermal coupler 130, 230, 330 (see process step 404). This closed-curve thermal coupler 130, 230, 330 can be formed so as to be smaller than the closed-curve waveguide 120, 220, 320 with essentially the same complete loop or ring shape and further so as to be laterally surrounded by and thermally coupled to the closed-curve waveguide 120, 220, 320. Thermal coupling between the closed-curve waveguide 120, 220, 320 and the closed-curve thermal coupler 130, 230, 330 can be achieved by forming the closed-curve thermal coupler 130, 230, 330 such that it abuts or is sufficiently close to the closed-curve waveguide 120, 220, 320 to ensure that heat energy from the closed-curve thermal coupler 130, 230, 330 can pass into the closed-curve waveguide 120, 220, 320. Furthermore, this closed-curve thermal coupler 130, 230, 330 can be formed so as to have a second height that is less than the first height of the closed-curve waveguide 120, 220, 320. For purposes of this disclosure, a "thermal coupler" refers to a non-contacted component made of any suitable non-metallic electrically insulative thermally conductive material through which heat energy can be transmitted without also transmitting electric current. Exemplary thermal coupler materials are discussed in greater detail below with respect to specific method embodiments.

The method can further include forming a heating element 140, 240, 340 to facilitate thermal tuning of the closed-curve waveguide 120, 220, 320 (see process step 406). For purposes of this disclosure, a "heating element" refers to a resistor made of any suitable conductive material through which electric current flows in response to a voltage differential at the contacts and is converted into heat energy. Those skilled in the art will recognize that the direction and amount of current flow will depend upon the voltage differential. Furthermore, the amount of heat generated per unit length will depend upon the material used and the current density (which is a function of the cross-sectional area of the heating element). In this case, instead of forming the heating element 140, 240, 340 such that it is directly thermally coupled to the closed-curve waveguide for thermal tuning, the heating element 140, 240, 340 can be formed such that it is thermally coupled to the closed-curve thermal coupler 130, 230, 330 and thereby indirectly thermally coupled to the closed-curve waveguide 120, 220, 320. For example, the heating element can be formed at the same design level or a different design level as the closed-curve thermal coupler 130, 230, 330. Thermal coupling between the heating element 140, 240, 240 and the closed-curve thermal coupler 130, 230, 330 can be achieved by forming the heating element 140, 240, 340 such that it abuts or is sufficiently close to the closed-curve thermal coupler 130, 230, 330 to ensure that heat energy from the heating element 140, 240, 340 can pass into the closed-curve thermal coupler 130, 230, 330. Exemplary heating element materials are discussed in greater detail below with regard to the specific embodiments.

The various method embodiments can vary with regard to the specific processing techniques and/or materials used during process steps 402-408 to form the photonic structure embodiments 100A-100D, 200A-200D, 300A-300B and more particularly to form the different components (e.g., for the waveguide(s), the thermal coupler, and the heating element) thereof.

For example, referring to FIG. 1 and also FIGS. 1A-1D, in some embodiments of the method, process steps 402-408 can be performed so that the heating element 140, the closed-curve thermal coupler 130, the closed-curve waveguide 120 and, if applicable, the bus waveguide 110 are all at the same design level and, particularly, immediately adjacent to the top surface of the insulator layer 102 and further so that the closed-curve thermal coupler 130 is positioned laterally between and immediately adjacent to both the closed-curve waveguide 120 and the heating element 140.

Figure 5A:
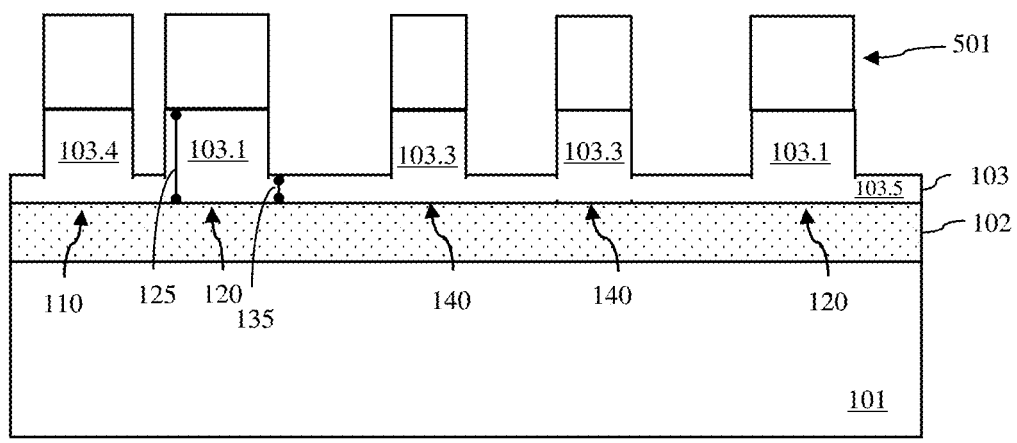
FIGS. 5A-5C are cross-section diagrams illustrating exemplary process steps for forming the photonic structure embodiment shown in FIG. 1A.
Figure 5B:
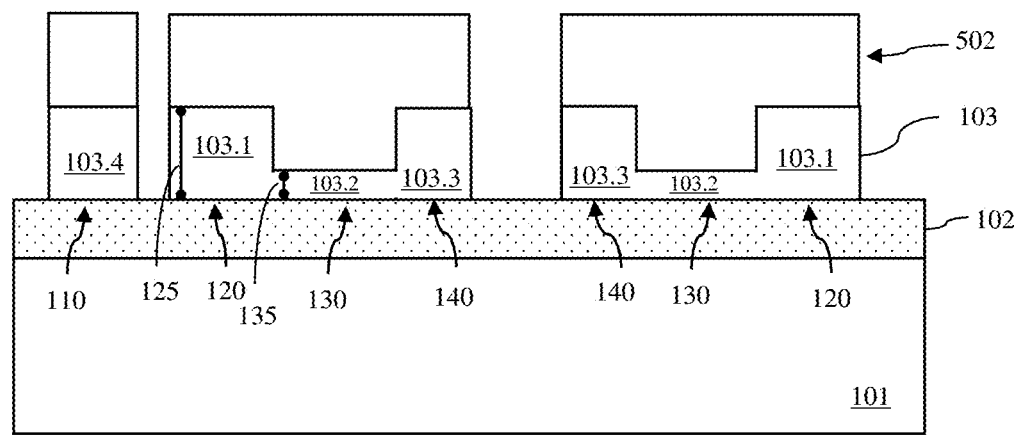
Figure 5C:
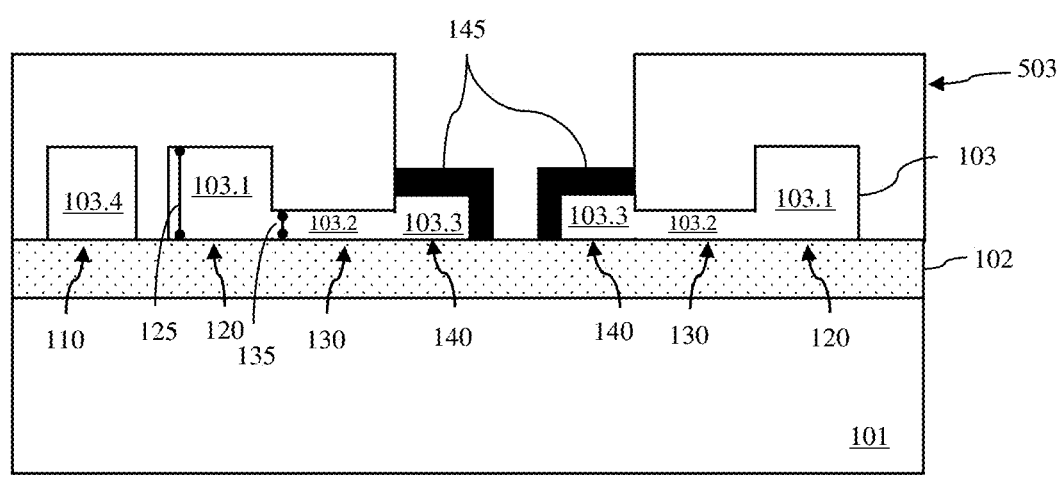

Exemplary process steps for forming the photonic structure embodiment 100A of FIG. 1A are illustrated in FIGS. 5A-5C. For example, a mask 501 can be formed on the semiconductor layer 103 (e.g., using conventional lithographic patterning and etch techniques or any other suitable mask formation techniques) and an anisotropic etch process can be performed in order to define, in the semiconductor layer 103, the initial shapes for a bus waveguide 110 (see portion 103.4), for a closed-curve waveguide 120 (see portion 103.1) and for a heating element 140 (see portion 103.3) each having a first height 125 and doing so without etching completely through the semiconductor layer 103, thereby leaving a recessed portion 103.5 of the semiconductor layer 103 (also referred as a slab portion) with a second height 135 that is less than the first height 125 covering the insulator layer 102 between the thicker patterned portions 103.1, 103.3 and 103.4 (see FIG. 5A). The mask 501 can be removed. Then, another mask 502 can be formed on the partially completed structure (e.g., using conventional lithographic patterning and etch techniques or any other suitable mask formation techniques) and an anisotropic etch process can then be performed to completely remove exposed sections of the recessed portion of the semiconductor layer (e.g., those sections immediately adjacent to opposing sides of the bus waveguide and immediately adjacent to the outer curved sidewall of the closed-curve waveguide), leaving intact a recessed portion 103.2 of the semiconductor layer 103 for the closed-curve thermal coupler 130 extending laterally between and immediately adjacent to the thick patterned portions 103.1 and 103.3 of the semiconductor layer (i.e., extending laterally between and immediately adjacent to the closed-curve waveguide 120 and the heating element 140) (see FIG. 5B). The mask 502 can be removed. Then another mask 503 can be formed on the partially completed structure (e.g., using conventional lithographic patterning and etch techniques or any other suitable mask formation techniques) and a metal silicide process can be performed in order to form a metal silicide layer 145 for the heating element 140 on exposed surfaces of the thick patterned portion 103.3 of the semiconductor layer. The metal silicide layer 145 could be, for example, a cobalt silicide (CoSi) layer, a nickel silicide (NiSi) layer, a tungsten silicide (WSi) layer, a titanium silicide (TiSi) layer, or any other suitable metal silicide layer. Optionally, the metal silicide layer 145 could be doped with N-type or P-type dopants for reduced resistance. Techniques for forming metal silicide layers are well known in the art and, thus, omitted from this specification in order to allow the reader to focus on the salient aspects of the disclosed embodiments.

As a result of the process steps shown in FIGS. 5A-5C and described above, the closed-curve waveguide 120, the closed-curve thermal coupler 130, and the heating element 140 include continuous portions 103.1-103.3 of the same semiconductor layer 103 (e.g., the same silicon layer or, alternatively, the same polysilicon, germanium, or silicon germanium layer) on the insulator layer 102. That is, the closed-curve waveguide 120 is made of a first portion 103.1 of the semiconductor layer 103, which has a first thickness (i.e., see the first height 125). The closed-curve thermal coupler 130 is made of a second portion 103.2 of the semiconductor layer 103 (also referred to herein as a recessed portion or slab portion), which is continuous with the first portion 103.1 but which has been recessed (i.e., etched back) so as to have a second thickness (i.e., see the second height 135) that is less than the first portion (i.e., the second portion 103.2 is thinner than the first portion 103.2). The heating element 140 includes both a third portion 103.3 of the semiconductor layer 103, which is continuous with the second portion 103.2, and a metal silicide layer 145 on the third portion 103.3.

Figure 6A:
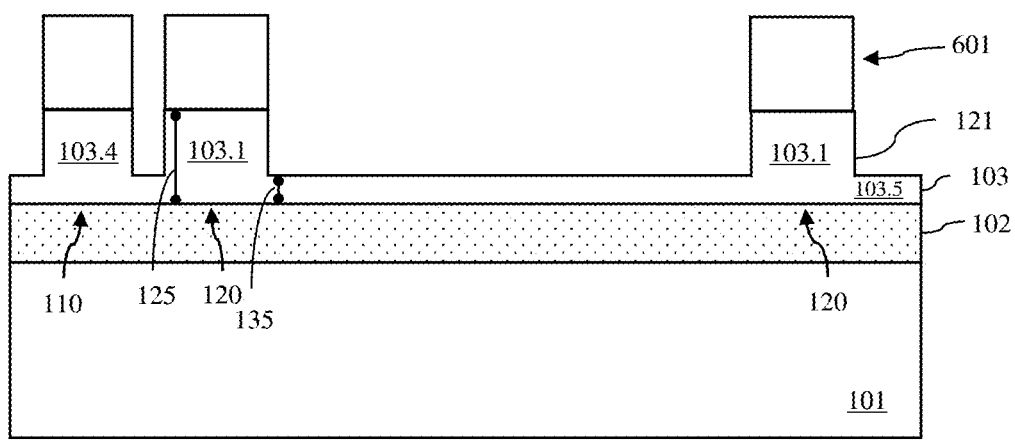
FIGS. 6A-6C are cross-section diagrams illustrating exemplary process steps for forming the photonic structure embodiment shown in FIG. 1B.
Figure 6B:
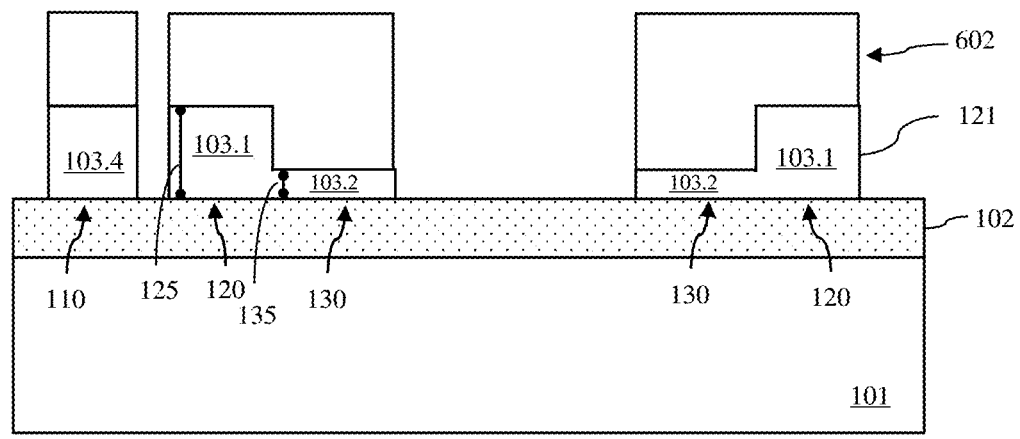
Figure 6C:
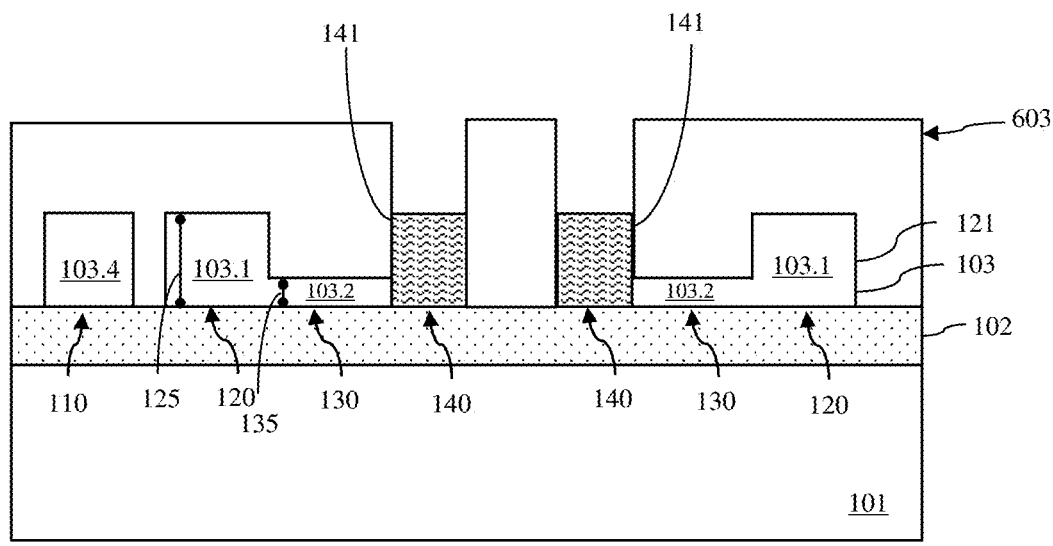

Exemplary process steps for forming the photonic structure embodiment 100B of FIG. 1B are illustrated in FIGS. 6A-6C. For example, a mask 601 can be formed on the semiconductor layer 103 (e.g., using conventional lithographic patterning and etch techniques or any other suitable mask formation techniques) and an anisotropic etch process can be performed in order to define, in the semiconductor layer 103, the initial shapes for a bus waveguide 110 (see portion 103.4) and for a closed-curve waveguide 120 (see portion 103.1) each having a first height 125 and doing so without etching completely through the semiconductor layer 103, thereby leaving a recessed portion 103.5 of the semiconductor layer 103 (also referred as a slab portion) with a second height 135 that is less than the first height 125 covering the insulator layer 102 between the thicker patterned portions 103.1 and 103.4 (see FIG. 6A). The mask 601 can be removed. Then, another mask 602 can be formed on the partially completed structure (e.g., using conventional lithographic patterning and etch techniques or any other suitable mask formation techniques) and an anisotropic etch process can then be performed to completely remove specific sections of the recessed portion of the semiconductor layer (e.g., immediately adjacent to opposing sides of the bus waveguide, immediately adjacent to the outer curved sidewall of the closed-curve waveguide and spatially separated from the inner curved sidewall of the closed-curve waveguide), leaving intact a recessed portion 103.2 of the semiconductor layer 103 for the closed-curve thermal coupler 130 positioned laterally immediately to the thick patterned portion 103.1 of the semiconductor layer (i.e., positioned laterally immediately adjacent to the closed-curve waveguide 120) (see FIG. 6B). The mask 602 can be removed. Then another mask 603 can be formed on the partially completed structure (e.g., using conventional lithographic patterning and etch techniques or any other suitable mask formation techniques) and a metal or metal alloy resistive element 141 for the heating element 140 can be formed (e.g., deposited into a patterned opening in the mask) above and immediately adjacent to the insulator layer 102 and further positioned laterally immediately adjacent to the recessed portion 103.2 of the semiconductor layer (i.e., so as to abut the closed-curve thermal coupler 130). This resistive element 141 can be made, for example, of tungsten, aluminum, nickel, titanium, tantalum, cobalt, copper, or alloys thereof. As a result of the process steps shown in FIGS. 6A-6C and described above, the closed-curve waveguide 120 and the closed-curve thermal coupler 130 are continuous portions 103.1-103.2 of the same semiconductor layer 103, but the heating element 140 is a discrete metal or metal alloy feature.

Figure 7A:
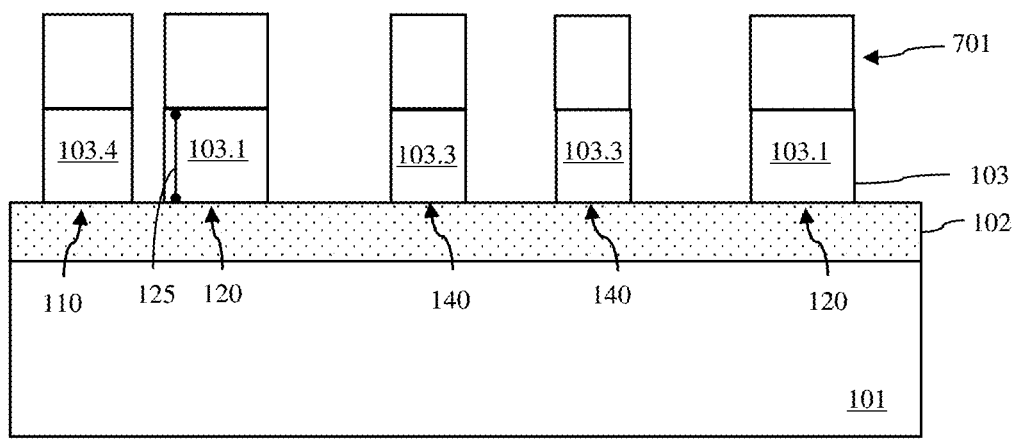
FIGS. 7A-7C are cross-section diagrams illustrating exemplary process steps for forming the photonic structure embodiment shown in FIG. 1C.
Figure 7B:
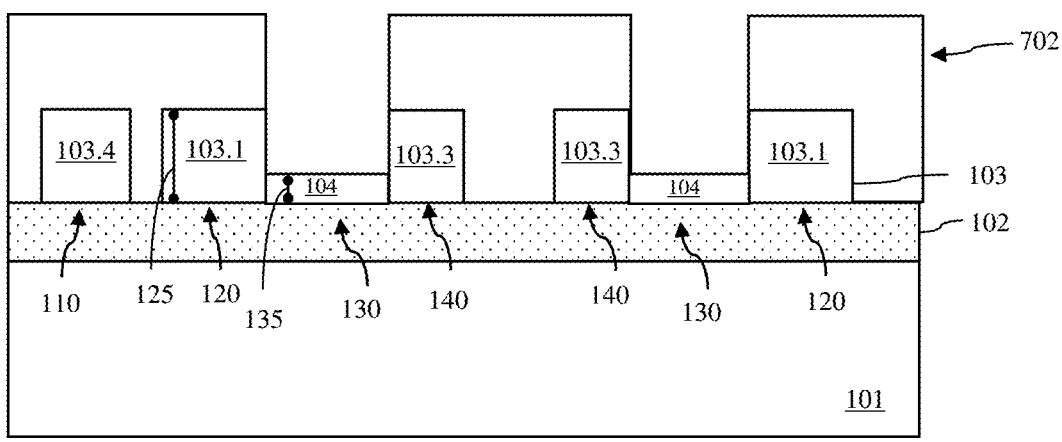
Figure 7C:
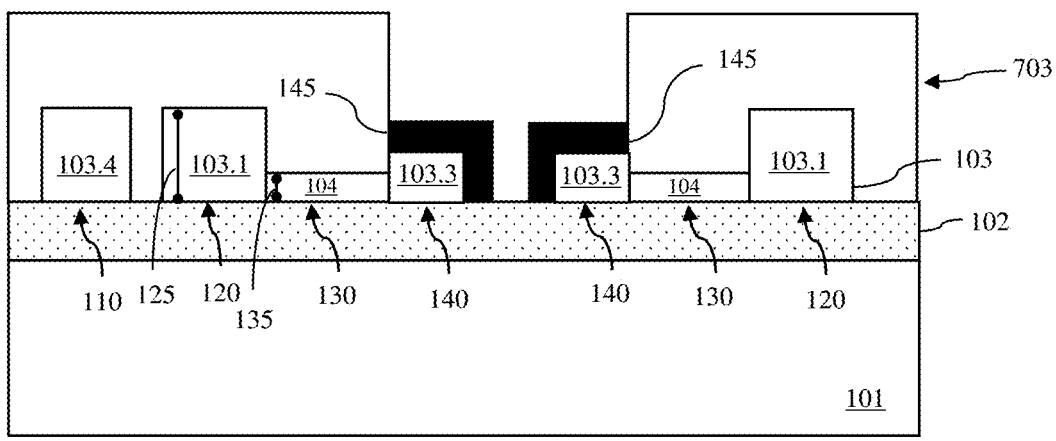

Exemplary process steps for forming the photonic structure embodiment 100C of FIG. 1C are illustrated in FIGS. 7A-7C. For example, a mask 701 can be formed on the semiconductor layer 103 (e.g., using conventional lithographic patterning and etch techniques or any other suitable mask formation techniques) and an anisotropic etch process can be performed in order to define, in the semiconductor layer 103, discrete shapes for a bus waveguide 110 (see portion 103.4), for a closed-curve waveguide 120 (see portion 103.1) and for a heating element 140 (see portion 103.3) each having a first height 125 and doing so in a manner that completely etches through the semiconductor layer 103, thereby exposing portions of the insulator layer 102 between the patterned portions 103.1, 103.3 and 103.4 (see FIG. 7A). The mask 701 can be removed. Then, another mask 702 can be formed on the partially completed structure (e.g., using conventional lithographic patterning and etch techniques or any other suitable mask formation techniques) and a non-metallic electrically insulative thermally conductive material can be deposited into an opening in the mask 702 between the patterned portions 103.1 and 103.2 of the semiconductor layer and recessed so as to have a second height 135 that is less than the first height, thereby forming a non-metallic electrically insulative thermally conductive feature 104 for a closed-curve thermal coupler 130 (see FIG. 7B). Exemplary non-metallic electrically insulative thermally conductive materials that could be used include, but are not limited to, polysilicon, boron nitride, silicon carbide, or diamond. The mask 702 can be removed. Then yet another mask 703 can be formed on the partially completed structure (e.g., using conventional lithographic patterning and etch techniques or any other suitable mask formation techniques) and a metal silicide process can be performed in order to form a metal silicide layer 145 for the heating element 140 on exposed surfaces of the thick patterned portion 103.3 of the semiconductor layer. As discussed above, the metal silicide layer 145 could be, for example, any of a cobalt silicide (CoSi) layer, a nickel silicide (NiSi) layer, a tungsten silicide (WSi) layer, a titanium silicide (TiSi) layer, or any other suitable metal silicide layer. Optionally, the metal silicide layer 145 could be doped with N-type or P-type dopants for reduced resistance.

Figure 8A:
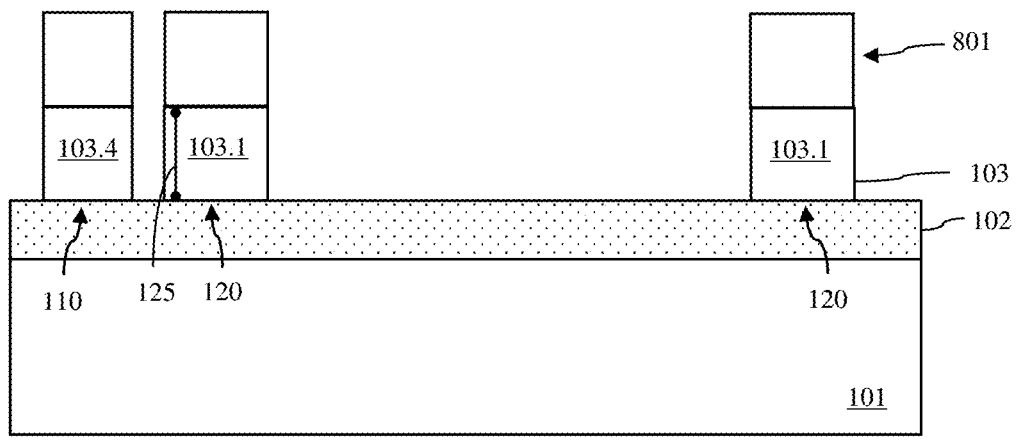
FIGS. 8A-8C are cross-section diagrams illustrating exemplary process steps for forming the photonic structure embodiment shown in FIG. 1D.
Figure 8B:
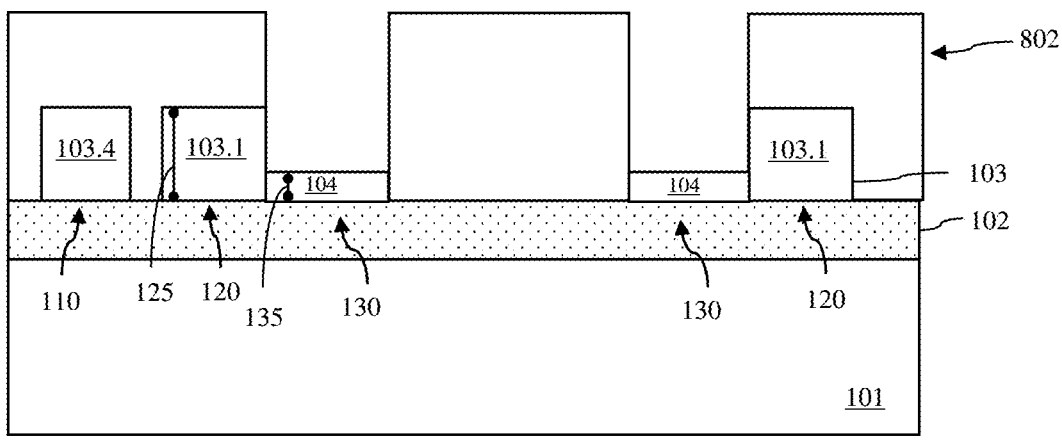
Figure 8C:
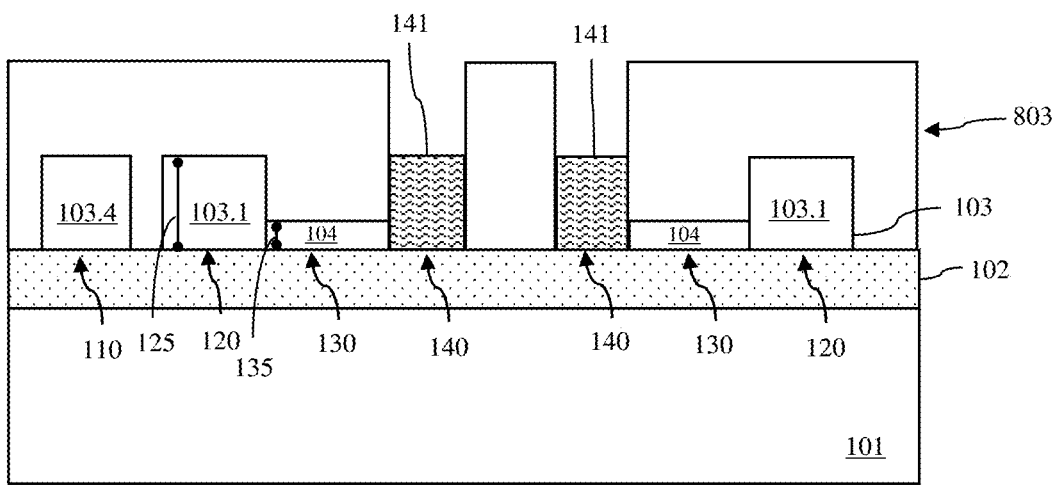

Exemplary process steps for forming the photonic structure embodiment 100D of FIG. 1D are illustrated in FIGS. 8A-8C. For example, a mask 801 can be formed on the semiconductor layer 103 (e.g., using conventional lithographic patterning and etch techniques or any other suitable mask formation techniques) and an anisotropic etch process can be performed in order to define, in the semiconductor layer 103, discrete shapes for a bus waveguide 110 (see portion 103.4) and for a closed-curve waveguide 120 (see portion 103.1) each having a first height 125 and doing so in a manner that completely etches through the semiconductor layer 103, thereby exposing portions of the insulator layer 102 between and adjacent to the patterned portions 103.1 and 103.4 (see FIG. 7B). The mask 801 can be removed. Then, another mask 802 can be formed on the partially completed structure (e.g., using conventional lithographic patterning and etch techniques or any other suitable mask formation techniques) and a non-metallic electrically insulative thermally conductive material can be deposited into an opening in the mask 802 adjacent to an inner curved sidewall of the patterned portion 103.1 and recessed so as to have a second height 135 that is less than the first height, thereby forming a non-metallic electrically insulative thermally conductive feature 104 for a closed-curve thermal coupler 130 (see FIG. 8B). As discussed above, non-metallic electrically insulative thermally conductive materials that could be used include, but are not limited to, polysilicon, silicon, nitride, boron nitride, silicon carbide, or diamond. The mask 802 can be removed. Then yet another mask 803 can be formed on the partially completed structure (e.g., using conventional lithographic patterning and etch techniques or any other suitable mask formation techniques) and a metal or metal alloy resistive element 141 for the heating element 140 can be formed (e.g., deposited into a patterned opening in the mask) above and immediately adjacent to the insulator layer 102 and further positioned laterally immediately adjacent to the non-metallic electrically insulative thermally conductive feature 104 (i.e., so as to abut the closed-curve thermal coupler 130). As discussed above, such a resistive element 141 can be made, for example, of tungsten, aluminum, nickel, titanium, tantalum, cobalt, copper, or alloys thereof.

The process steps described above and illustrated in FIG. 5A-5C, 6A-6C, 7A-7C or 8A-8C are provided for illustration purposes and are not intended to be limiting. The order of the process steps could vary any and/or alternative process steps could be performed to form the desired components. In any case, the process steps described above and illustrated in FIG. 5A-5C, 6A-6C, 7A-7C or 8A-8C can be followed by deposition of one or more layers of dielectric material 105 to cover exposed surfaces of the insulator layer 102 and any device components thereon. For example, the layer(s) of dielectric material can be deposited so as to cover the optical device 199 (including the closed-curve waveguide 120 and, if applicable, the bus waveguide 110), the closed-curve thermal coupler 130 and the heating element 140. This dielectric material 105 and, particularly, any dielectric material deposited directly onto the optical waveguide(s) can be any dielectric material that is suitable for use as cladding material for those optical waveguide(s). For example, if the optical waveguide(s) are silicon waveguide(s), which as discussed above can has a temperature and wavelength-dependent refractive index that is typically above 3.2, then the layer of dielectric material 105 that is immediately adjacent to those optical waveguide(s) could be silicon dioxide (e.g., with a refractive index of less than 1.6), silicon nitride (e.g., with a refractive index of less than 2.1), or any other suitable dielectric material that has a refractive index that is less than the lowest refractive index of silicon.

It should be understood that similar processes could be performed to form the photonic structure embodiments 200A-200D of FIGS. 2 and 2A-2D except that the various patterning processes can be performed to ensure that the closed-curve thermal coupler 230 is physically separated from the closed-curve waveguide 220 and/or from the heating element 240 by space(s) 250. Additionally, it should be understood that similar processes could be performed in order to form the photonic structure embodiments 300A-300B of FIGS. 3 and 3A-3B except that formation of the heating element 340 will be performed only during BEOL processing after deposition of the dielectric material 305 over the optical device 399 (including the closed-curve waveguide 320 and, if applicable, the bus waveguide 310) and the closed-curve thermal coupler 330 in a lower design level.

Referring again to FIG. 4, the method can further include using the heating element 140, 240, 340 to thermally tune the closed-curve waveguide 120, 220, 320 via the closed-curve thermal coupler 130, 230, 330 (e.g., using the heating element to generate and output heat energy, which passes into and through the closed-curve thermal coupler and which further passes into the closed-curve waveguide) in order to minimize any temperature-dependent resonance shift (TDRS) (see process step 408). That is, during thermal tuning, heat energy can be generated and output by the heating element 140, 240, 340 and, due to thermal coupling, can be passed into the closed-curve thermal coupler 130, 230, 330, can travel through the closed-curve thermal coupler 130, 230, 330, and can pass from the closed-curve thermal coupler 130, 230, 330 into the lower portion of the closed-curve waveguide 120, 220, 320. The amount of heat energy can be predetermined to ensure that the temperature of the closed-curve waveguide 120, 220, 320 is maintained at a specific temperature or within a specific temperature range so as to ensure that light signals of the specific resonant wavelength will build up intensity as they make repeated roundtrips through the closed-curve waveguide 120, 220, 320.

It should be noted that the method embodiments can further include, prior to forming the various components (i.e., the closed-curve waveguide, the closed-curve thermal coupler, and the heating element), predetermining the dimensions of the various components as well as the materials of the components and any spacing between the components to ensure that the desired resonant wavelength can be achieve through thermal tuning of the closed-curve waveguide by the heating element through the closed-curve thermal coupler can be achieved.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections and buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

In some of the photonic structure and method embodiments described above, some components (e.g., the closed curved-waveguide, the closed-curve thermal coupler, and a part of the heating element, as in FIG. 1A; or the closed-curve waveguide and closed-curve thermal coupler, as in FIG. 1B, 2A, 2B or 3A) are referred to as being continuous portions of the same semiconductor layer. It should be understood that any two "continuous portions of the same semiconductor layer" that make up any two components, respectively, of the photonic structure will be portions of a semiconductor layer that are immediately adjacent to each other but otherwise processed so as to be distinguishable, as described above. For example, the semiconductor layer can be formed on (e.g., deposited onto) the insulator layer and subsequently processed in such a way that the two portions at issue are not physically separated but have different dimensions and, particularly, different heights and shapes so as to be distinguishable, as described above. Thus, for example, in the embodiments shown in FIGS. 1A, 1B, 2A, 2B, and 3A, the closed-curve waveguide 120, 220, 320 and the closed-curve thermal coupler 130, 230, 330 are continuous portions of the same semiconductor layer with the closed-curve waveguide 120, 220, 320 being a first portion 103.1, 203.1, 303.1 of the semiconductor layer and the closed-curve thermal coupler being a second portion 103.2, 203.2, 303.2 that is thinner than the first portion 103.1, 203.1, 303.1 and that extends laterally from immediately adjacent to the first portion 103.1, 203.1, 303.1.

Additionally, in the photonic structure and method embodiments described above, some components (e.g., the bus waveguide in FIGS. 1A, 1B, 2B, and 3A; the bus waveguide, the closed curved-waveguide, and a part of the heating element, as in FIGS. 1C and 2C; and the bus waveguide and the closed curved-waveguide, as in FIGS. 1D, 2D and 3B) are described as being discrete portions of the same semiconductor layer. It should be understood that a "discrete portion" of a semiconductor layer that makes up a component of the photonic structure is a patterned portion of the semiconductor layer that is physically separated from all other portions so as to be distinguishable, as described above. For example, the semiconductor layer can be formed on (e.g., deposited onto) the insulator layer and subsequently processed in such a way that the portion at issue is physically separated from all other portions and has the desired dimensions, as described above.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a closed-curve waveguide above and immediately adjacent to an insulator layer and having a first height, wherein the closed-curve waveguide has an outer curved sidewall that extends essentially vertically from the insulator layer to the first height;
   a closed-curve thermal coupler above and immediately adjacent to the insulator layer and further laterally surrounded by and immediately adjacent to the closed-curve waveguide, wherein the closed-curve thermal coupler has a second height that is less than the first height; and
   a heating element above and immediately adjacent to the insulator layer and laterally surrounded by the closed-curve thermal coupler,
      wherein the closed-curve waveguide, the closed-curve thermal coupler and the heating element are ring-shaped with the closed-curve waveguide being larger than the closed-curve thermal coupler and the closed-curve thermal coupler being larger than the heating element, and
      wherein the closed-curve thermal coupler is adapted to pass heat energy from the heating element to the closed-curved waveguide.

2. The structure of claim 1,
   wherein the closed-curve waveguide and the closed-curve thermal coupler have continuous ring shapes,
   wherein the heating element is any of a continuous ring shape, an open ring shape, and a segmented ring shape, and
   wherein the structure further comprises dielectric material above and immediately adjacent to the insulator layer and positioned laterally adjacent to and covering the outer curved sidewall, above and immediately adjacent to top surfaces of the closed-curve thermal coupler and the closed-curve thermal waveguide, and further above and immediately adjacent to the insulator layer and laterally surrounded by and immediately adjacent to the heating element.

3. The structure of claim 1, wherein the closed-curve thermal coupler abuts the closed-curve waveguide and is separated from the heating element by dielectric material.

4. The structure of claim 1, wherein the heating element has a third height that is greater than the second height.

5. The structure of claim 1,
   wherein the closed-curve waveguide comprises a first portion of a semiconductor layer,
   wherein the semiconductor layer comprises any of a silicon layer, a polysilicon layer, a germanium layer, and a silicon germanium layer,
   wherein the closed-curve thermal coupler comprises a second portion of the semiconductor layer that extends laterally from the first portion and is thinner than the first portion, and
   wherein the heating element comprises a third portion of the semiconductor layer and a metal silicide layer on the third portion.

6. The structure of claim 1,
   wherein the closed-curve waveguide comprises a semiconductor material,
   wherein the closed-curve thermal coupler comprises an electrically insulative thermally conductive material that is different from the semiconductor material, and
   wherein the heating element comprises a metallic material different from the materials of the closed-curve waveguide and the closed-curve thermal coupler.

7. The structure of claim 1, wherein ring shapes of the closed-curve waveguide, the closed-curve thermal coupler and the heating element are all one of oval ring shapes, circular ring shapes, and racetrack ring shapes.

8. A structure comprising:
   a ring resonator comprising:
      a bus waveguide above and immediately adjacent to an insulator layer and having a first height, wherein the bus waveguide has a planar sidewall extending essentially vertically from the insulator layer to the first height; and
      a closed-curve waveguide above and immediately adjacent to the insulator layer, positioned laterally adjacent to the bus waveguide, and having the first height, wherein the closed-curve waveguide has an outer curved sidewall that extends essentially vertically from the insulator layer to the first height;
   dielectric material above and immediately adjacent to the insulator layer and laterally surrounding and immediately adjacent to the outer curved sidewall, wherein the dielectric materials fills a space between the planar sidewall and the outer curved sidewall;
   a closed-curve thermal coupler above and immediately adjacent to the insulator layer and further laterally surrounded by and immediately adjacent to the closed-curve waveguide, wherein the closed-curve thermal coupler has a second height that is less than the first height; and
   a heating element above and immediately adjacent to the insulator layer and further laterally surrounded by the closed-curve thermal coupler,
      wherein the closed-curve waveguide, the closed-curve thermal coupler and the heating element are ring-shaped with the closed-curve waveguide being larger than the closed-curve thermal coupler and the closed-curve thermal coupler being larger than the heating element, and
      wherein the closed-curve thermal coupler is adapted to pass heat energy from the heating element to the closed-curved waveguide.

9. The structure of claim 8,
   wherein the closed-curve waveguide and the closed-curve thermal coupler have continuous ring shapes,
   wherein the heating element is any of a continuous ring shape, an open ring shape, and a segmented ring shape, and
   wherein the dielectric material is further above and immediately adjacent to top surfaces of the closed-curve thermal coupler and the closed-curve thermal waveguide and above and immediately adjacent to the insulator layer and laterally surrounded by and immediately adjacent to the heating element.

10. The structure of claim 8, wherein the closed-curve thermal coupler abuts the closed-curve waveguide and is separated from the heating element by the dielectric material.

11. The structure of claim 8, wherein the heating element has a third height that is greater than the second height.

12. The structure of claim 8,
   wherein the closed-curve waveguide comprises a first portion of a semiconductor layer, wherein the semiconductor layer comprises any of a silicon layer, a polysilicon layer, a germanium layer, and a silicon germanium layer, wherein the closed-curve thermal coupler comprises a second portion of the semiconductor layer that extends laterally from the first portion and is thinner than the first portion, wherein the heating element comprises a third portion of the semiconductor layer and a metal silicide layer on the third portion, and wherein the bus waveguide comprises a fourth portion of the semiconductor layer.

13. The structure of claim 8, wherein the bus waveguide and the closed-curve waveguide comprise a semiconductor material, wherein the closed-curve thermal coupler comprises an electrically insulative thermally conductive material that is different from the semiconductor material, and wherein the heating element comprises a metallic material different from the materials of the closed-curve waveguide and the closed-curve thermal coupler.

14. The structure of claim 8, wherein ring shapes of the closed-curve waveguide, the closed-curve thermal coupler and the heating element are all one of oval ring shapes, circular ring shapes, and racetrack ring shapes.

15. A method comprising:

forming a closed-curve waveguide above and immediately adjacent to an insulator layer and having a first height, wherein the closed-curve waveguide has an outer curved sidewall that extends essentially vertically from the insulator layer to the first height;

forming a closed-curve thermal coupler above and immediately adjacent to the insulator layer and further laterally surrounded by and immediately adjacent the closed-curve waveguide and having a second height that is less than the first height; and forming a heating element above and immediately adjacent to the insulator layer and laterally surrounded by the closed-curve thermal coupler, wherein the closed-curve waveguide, the closed-curve thermal coupler and the heating element are ring-shaped with the closed-curve waveguide being larger than the closed-curve thermal coupler and the closed-curve thermal coupler being larger than the heating element, and wherein the closed-curve waveguide, the closed-curve thermal coupler, and the heating element are formed so that heat energy generated by the heating element passes through the closed-curve thermal coupler to the closed-curve waveguide.

16. The method of claim 15, wherein the method further comprises forming a bus waveguide having the first height adjacent to the outer curved sidewall, wherein the bus waveguide is formed above and immediately adjacent to the insulator layer, has a planar sidewall extending essentially vertically from the insulator layer to the first height, and is physically separated from the outer curved sidewall.

17. The method of claim 15, further comprising: providing a semiconductor layer on an insulator layer, wherein the semiconductor layer comprises any of a silicon layer, a polysilicon layer, a germanium layer, and a silicon germanium layer, wherein the forming of the closed-curve waveguide, the forming of the closed-curve thermal coupler and the forming of the heating element comprise patterning the semiconductor layer so that the closed-curve waveguide comprises a first portion of the semiconductor layer, so that the closed-curve thermal coupler comprises a second portion of the semiconductor layer that extends laterally from the first portion and is thinner than the first portion, and so that the heating element comprises a third portion of the semiconductor layer, and wherein the forming of the heating element further comprises forming a metal silicide layer on the third portion of the semiconductor layer.

18. The method of claim 15, further comprising: providing a semiconductor layer on an insulator layer, wherein the semiconductor layer comprises a semiconductor material comprising any of silicon, polysilicon, germanium layer, and silicon germanium, wherein the forming of the closed-curve waveguide comprises patterning the semiconductor layer so that the closed-curve waveguide comprises a portion of a semiconductor layer, and wherein the forming of the closed-curve thermal coupler comprises depositing and patterning an electrically insulative thermally conductive material that is different from the semiconductor material.

19. The method of claim 15, wherein the closed-curve waveguide and the closed-curve thermal coupler are formed so as to have continuous ring shapes, wherein the heating element is formed to have a third height that is greater than the second height and to have any of a continuous ring shape, an open ring shape, and a segmented ring shape, and wherein the method further comprises forming dielectric material above and immediately adjacent to the top surface of the insulator layer and positioned laterally adjacent to and covering the outer curved sidewall, above and immediately adjacent to top surfaces of the closed-curve thermal coupler and the closed-curve thermal waveguide, and further above and immediately adjacent to the top surface of the insulator layer and laterally surrounded by and immediately adjacent to the heating element.

20. The method of claim 15, further comprising using the heating element to thermally tune the closed-curve waveguide through the closed-curve thermal coupler.

* * * * *